(12) United States Patent
Furuya et al.

(10) Patent No.: US 12,086,731 B2
(45) Date of Patent: Sep. 10, 2024

(54) WORKSHOP ASSISTANCE SYSTEM AND WORKSHOP ASSISTANCE METHOD

(71) Applicant: Hitachi, Ltd., Tokyo (JP)

(72) Inventors: Shuhei Furuya, Tokyo (JP); Yo Takeuchi, Tokyo (JP); Kiyoshi Kumagai, Tokyo (JP); Toshiyuki Ono, Tokyo (JP); Masao Ishiguro, Tokyo (JP); Tatsuya Tokunaga, Tokyo (JP); Chisa Nagai, Tokyo (JP); Takashi Sumiyoshi, Tokyo (JP); Naoyuki Kanda, Tokyo (JP); Kenji Nagamatsu, Tokyo (JP); Kenji Ohya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 790 days.

(21) Appl. No.: 17/278,596

(22) PCT Filed: Jan. 31, 2019

(86) PCT No.: PCT/JP2019/003372
§ 371 (c)(1),
(2) Date: Mar. 22, 2021

(87) PCT Pub. No.: WO2020/070906
PCT Pub. Date: Apr. 9, 2020

(65) Prior Publication Data
US 2021/0357792 A1  Nov. 18, 2021

(30) Foreign Application Priority Data

Oct. 3, 2018  (JP) ................... 2018-188381

(51) Int. Cl.
*G06F 16/33* (2019.01)
*G06F 16/338* (2019.01)
(Continued)

(52) U.S. Cl.
CPC .......... *G06N 5/043* (2013.01); *G06F 16/3344* (2019.01); *G06F 16/338* (2019.01);
(Continued)

(58) Field of Classification Search
CPC ... G06N 5/043; G06F 16/3344; G06F 16/338; G06F 16/00; G06Q 10/101; G06Q 30/0201; G06Q 10/10; G10L 15/26; Y02P 90/30
See application file for complete search history.

(56) References Cited

U.S. PATENT DOCUMENTS

2018/0012598 A1\* 1/2018 Thirukovalluru ....... G10L 15/26
2018/0131642 A1\* 5/2018 Trufinescu ............. G10L 15/22
(Continued)

FOREIGN PATENT DOCUMENTS

CN  101782920 A  7/2010
JP  2002-259289 A  9/2002
(Continued)

OTHER PUBLICATIONS

Examination Report in Counterpart Indian Application No. 202117012519, mailed Mar. 10, 2022.
(Continued)

*Primary Examiner* — Jorge A Casanova
(74) *Attorney, Agent, or Firm* — Foley & Lardner LLP

(57) ABSTRACT

In order to assist participants in thinking of an idea by acquiring audio data, it is provided a workshop assistance system, which includes a computer having an arithmetic apparatus configured to execute predetermined processing, a storage device coupled to the arithmetic apparatus, and a communication interface coupled to the arithmetic apparatus, the computer being configured to access solved problem case data including information of solved cases that correspond to problem data, the workshop assistance system
(Continued)

comprising: a problem processing module configured to search, by the arithmetic apparatus, solved cases based on problem data that is generated from a discussion among participants; and an idea generation module configured to present, by the arithmetic apparatus, idea data including the generated problem data and information of the solved case found in the search to the participants.

12 Claims, 25 Drawing Sheets

(51) Int. Cl.
    *G06N 5/043*       (2023.01)
    *G06Q 10/101*     (2023.01)
    *G06Q 30/0201*   (2023.01)
    *G10L 15/26*       (2006.01)

(52) U.S. Cl.
    CPC ....... *G06Q 10/101* (2013.01); *G06Q 30/0201* (2013.01); *G10L 15/26* (2013.01)

(56) References Cited

U.S. PATENT DOCUMENTS

| | | |
|---|---|---|
| 2018/0247240 A1 | 8/2018 | Kurotsuchi et al. |
| 2020/0118691 A1* | 4/2020 | Kiljanek ................. G06N 20/00 |
| 2021/0037353 A1* | 2/2021 | Locascio ................. H04L 67/02 |

FOREIGN PATENT DOCUMENTS

| | | |
|---|---|---|
| JP | 2002259189 A | 9/2002 |
| JP | 2015-184971 A | 10/2015 |
| JP | 2017-059069 A | 3/2017 |
| JP | 2018-142190 A | 9/2018 |

OTHER PUBLICATIONS

Written Opinion issued in corresponding Singapore Application No. 11202102853Y dated Aug. 22, 2022 (7 pages).

International Search Report with English translation and Written Opinion issued in corresponding application No. PCT/JP2019/003372 dated Apr. 9, 2019.

Office Action issued in corresponding Chinese Application No. 201980062004.3 dated Jun. 12, 2024 with Machine translation (14 pages).

* cited by examiner

| WORKSHOP ID 1101 | PROBLEM ID 1102 | PROBLEM NUMBER 1103 | TEXT DATA AND UTTERER 1104 | PROBLEM TITLE 1105 125 |
|---|---|---|---|---|
| 10001 | 20001 | 1 | This is a problem called ***. (utterer a) | PROBLEM ABOUT *** |
| 10001 | 20002 | 2 | I think there is a problem of ---. (utterer b) I agree that there is such a problem (utterer c) | PROBLEM ABOUT --- |
| 10001 | 20003 | 3 | I think the problem is xxx. (utterer unknown) | XX PROBLEM |
| ... | ... | ... | ... | ... |

PROBLEM DATA

*Fig. 11*

| BUSINESS FIELD-BASED PROBLEM PATTERN DATA ID | BUSINESS FIELD | BUSINESS OPERATION PROCESS | TARGET | TARGET | TECHNOLOGY AND PRODUCT | ... |
|---|---|---|---|---|---|---|
| 00001 | MANUFAC-TURING | SELLING AND CUSTOMER SUPPORT | SALESPERSON | NO SALES KNOW-HOW | ** LEARNING SERVICE | ... |
| 00002 | MANUFAC-TURING | DISTRIBUTION | BUSINESS MANAGER | HIGH LOGISTICS COST | ** OPTIMIZATION TECHNOLOGY | ... |
| 00003 | FINANCE | ** SCREENING | SALESPERSON | CUMBERSOME PROCEDURE OF ** SCREENING | RPA SERVICE FOR ** SCREENING FORMS | ... |
| ... | ... | ... | ... | ... | ... | ... |

BUSINESS FIELD-BASED PROBLEM PATTERN DATA

*Fig. 12*

| SOCIAL PROBLEM PATTERN DATA ID | SOCIAL PROBLEM | PROBLEM DETAILS | KPI 1 DESIGNED TO SOLVE PROBLEM | KPI 2 DESIGNED TO SOLVE PROBLEM | ... |
|---|---|---|---|---|---|
| 00001 | POVERTY | MAKE SURE NO ONE IS FORCED TO LIVE ON 100 YEN OR LESS A DAY | PROPORTION OF POVERTY GROUP | ... | ... |
| 00002 | POVERTY | CREATE FRAMEWORK FOR INVESTMENT TO ERADICATE POVERTY | CAPITAL INVESTMENT TO POVERTY GROUP | ... | ... |
| 00003 | ENERGY | PROMOTE INVESTMENT TO RENEWABLE ENERGY | AMOUNT OF INVESTMENT TO RENEWABLE ENERGY | ... | ... |
| ... | ... | ... | ... | ... | ... |

SOCIAL PROBLEM PATTERN DATA

*Fig. 13*

| TECHNOLOGY AND PRODUCT DATA ID 1401 | BUSINESS FIELD 1402 | TECHNOLOGY AND PRODUCT NAME 1403 | OUTLINE 1404 | PROBLEM 1405 | FEATURE 1406 | ... 128 |
|---|---|---|---|---|---|---|
| 00001 | FINANCE | ** TECHNOLOGY | $$ TECHNOLOGY FOR ** THAT UTILIZES -- | XX COST IN ** | REDUCTION OF XX COST | ... |
| 00002 | HEALTHCARE | -- OPTIMIZATION SERVICE | OPTIMIZATION OF -- FOR ** | LARGE WASTE OF -- | ELIMINATE WASTE BY OPTIMIZING -- | ... |
| 00003 | SERVICE INDUSTRY | ** PLATFORM SERVICE | -- SERVICE UTILIZING ** PLATFORM | HIGH COST TO LAUNCH -- SERVICE | INEXPENSIVE AND SECURE -- SERVICE CAN BE LAUNCHED | ... |
| ... | ... | ... | ... | ... | ... | ... |

TECHNOLOGY AND PRODUCT DATA

*Fig. 14*

| IDEA ID | WORKSHOP ID | IDEA NUMBER | IDEA NAME | DETAILS | CONCEPTOR | TEXT | SOLVED PROBLEM | TECHNOLOGY AND PRODUCT | ... |
|---|---|---|---|---|---|---|---|---|---|
| 1501 | 1502 | 1503 | 1504 | 1505 | 1506 | 1507 | 1508 | 1509 | 129 |
| 10001 | 00001 | 1 | ** SERVICE | SERVICE IN WHICH ** IS EXECUTED BY PERFORMING ** ON -- | TARO XX | BY PERFORMING ** ON --, ** IS... | -- COST IS HIGH | ** TECHNOLOGY | ... |
| 10002 | 00001 | 2 | -- SERVICE | SERVICE FOR REDUCING -- | JIRO XX | SERVICE FOR REDUCING -- WITH RESPECT TO PROBLEM OF -- | -- IS BOTTLENECK | -- TECHNOLOGY | ... |
| ... | ... | ... | ... | ... | ... | ... | ... | ... | ... |

IDEA DATA

*Fig. 15*

| CASE ID | CASE NAME | CATEGORY | OUTLINE | PROBLEM | SOLUTION | TECHNOLOGY | DATA | FEEDBACK |
|---|---|---|---|---|---|---|---|---|
| | 1602 | 1603 | 1604 | 1605 | 1606 | 1607 | 1608 | 1609 |
| 00001 | OPTIMIZATION OF ** | MANU-FACTURING | XX WAS OPTIMIZED BY USING -- ON ** | LOW PRODUCTION EFFICIENCY DUE TO BOTTLENECK CAUSED BY -- OF ** | OPTIMIZE -- USING XX | -- OPTIMIZATION TECHNOLOGY | ** CAPACITY UTILIZATION RATIO | 10 POINTS |
| 00002 | -- ASSISTANCE SERVICE | HEALTH-CARE | ASSISTANCE SERVICE FOR -- | LABOR SHORTAGE IN -- BUSINESS | MATCHING OF REGISTERED SUBSTITUTE WORKERS | -- MATCHING TECHNOLOGY | -- DATA | 5 POINTS |
| 00003 | DETECTION OF FRAUD IN -- | FINANCE | FRAUD DETECTION SERVICE FOR -- | DAMAGE FROM UNAUTHORIZED TRANSACTION IN -- | FRAUD DETECTION USING XX TECHNOLOGY | XX TECHNOLOGY | -- TRANSACTION DATA | 3 POINTS |
| ... | ... | ... | ... | ... | ... | ... | ... | ... |

SOLVED PROBLEM CASE DATA

*Fig. 16*

| WORKSHOP ID | WORKSHOP NAME | CATEGORY | FACILITATOR | PARTICIPANT 1 | ROLE 1 | PARTICIPANT 2 | ROLE 2 |
|---|---|---|---|---|---|---|---|
| 00001 | ** WORKSHOP | MANUFACTURING | TARO XX | JIRO XX | TECHNOLOGY EXPERT | SABURO XX | DOMAIN EXPERT |
| 00002 | -- WORKSHOP | HEALTHCARE | SHIRO XX | HANAKO XX | DOMAIN EXPERT | GORO XX | TECHNOLOGY EXPERT |
| ... | ... | ... | ... | ... | ... | ... | ... |

WORKSHOP DATA

Fig. 17

WORKSHOP ASSISTANCE SYSTEM AND WORKSHOP ASSISTANCE METHOD

INCORPORATION BY REFERENCE

The present application claims priority from Japanese patent application JP 2018-188381 filed on Oct. 3, 2018, the content of which is hereby incorporated by reference into this application.

BACKGROUND OF THE INVENTION

This invention relates to a workshop assistance system.

A workshop in which knowledgeable persons having various kinds of knowledge are gathered to give opinions has been a way to think of ideas for a new technology or a new service. An innovative idea that has never been heard of may be born by consolidating opinions of different perspectives. However, it is difficult to gather knowledgeable persons having various kinds of knowledge for a workshop, and an actual workshop is often held among some of the knowledgeable persons who can attend. In this case, knowledge of the knowledgeable persons is not well-rounded, and knowledge outside specialized areas of the knowledgeable persons cannot be made use of. In particular, an innovative idea is thought to be born when knowledge in one field and knowledge in a different field that has not customarily been connected to the former field are joined. A system configured to assist in thinking of an idea that makes use of knowledge in different fields without attendance of knowledgeable persons having various kinds of knowledge to a workshop is therefore wanted.

Background art in a technical field of this invention includes the following related art. In JP 2017-59069 A, there is described an information providing apparatus including: a reception module configured to receive input information; an identification module configured to identify a field to which the input information belongs; an extraction module configured to identify a set including a plurality of pieces of information that have predetermined relativeness from information that belongs to the identified field, generate a plurality of new sets from the identified set by combining the identified set with a plurality of pieces of information that indicate predetermined operation, and extract information that has an attribute satisfying a predetermined condition in terms of the degree of similarity to an attribute originating from information that is included in the new sets; and an output module configured to output the extracted information.

SUMMARY OF THE INVENTION

The technology disclosed in JP 2017-59069 A is a technology for assisting a user in thinking by acquiring, as the input information, users' utterances and the like during brainstorming or a similar meeting, identifying a field of contents of a discussion based on the acquired information, and outputting, via a robot or the like, information of similar contents of a discussion in a different field, and can be used to present information that describes similar contents of a discussion in a different field. However, it is not often that a new service or a new technology is discussed from start to finish in a workshop, and a workshop more commonly has a plurality of phases, for example, a phase in which a customer's problem is discussed, a phase in which a value thereof is discussed, a phase in which technologies and products that may be made use of are discussed, and a phase in which all contents of the discussion are used as reference in devising a new service or technology. In a workshop thus having a plurality of phases, information required by participants varies from phase to phase, and the presenting of information of similar contents of a discussion in a different field is not enough in some cases.

This invention has been made in view of the above, and an object thereof is to assist participants in thinking of an idea by acquiring audio data that is generated during a workshop, and presenting information that is retrieved from a database appropriate for a phase of the workshop.

The representative one of inventions disclosed in this application is outlined as follows. There is provided a workshop assistance system, which includes a computer having an arithmetic apparatus configured to execute predetermined processing, a storage device coupled to the arithmetic apparatus, and a communication interface coupled to the arithmetic apparatus, the computer being configured to access solved problem case data including information of solved cases that correspond to problem data, the workshop assistance system comprising: a problem processing module configured to search, by the arithmetic apparatus, solved cases based on problem data that is generated from a discussion among participants; and an idea generation module configured to present, by the arithmetic apparatus, idea data including the generated problem data and information of the solved case found in the search to the participants.

According to at least one aspect of this invention, participants of a workshop can be assisted in thinking of an idea, and a specific deliverable with a high customer value can be generated in the workshop. Objects, configurations, and effects other than those described above are revealed in the following description of at least one embodiment.

BRIEF DESCRIPTION OF THE DRAWINGS

FIG. 11 is a diagram for illustrating a configuration example of the problem data.

FIG. 12 is a diagram for illustrating a configuration example of the business field-based problem pattern data.

FIG. 13 is a diagram for illustrating a configuration example of the social problem pattern data.

FIG. 14 is a diagram for illustrating a configuration example of the technology and product data.

FIG. 15 is a diagram for illustrating a configuration example of the idea data.

FIG. 16 is a diagram for illustrating a configuration example of the solved problem case data.

FIG. 17 is a diagram for illustrating a configuration example of the workshop data.

DETAILED DESCRIPTION OF THE PREFERRED EMBODIMENT

At least one embodiment of this invention is described in detail with reference to FIG. 1 to FIG. 25.

A workshop assistance system 115 of at least one embodiment is a system for providing assistance in thinking of an idea in a workshop by making use of contents of a discussion among a facilitator 104 and participants 107 to search a database appropriate for a phase of the workshop and present information that is found through the search.

Figure 1:
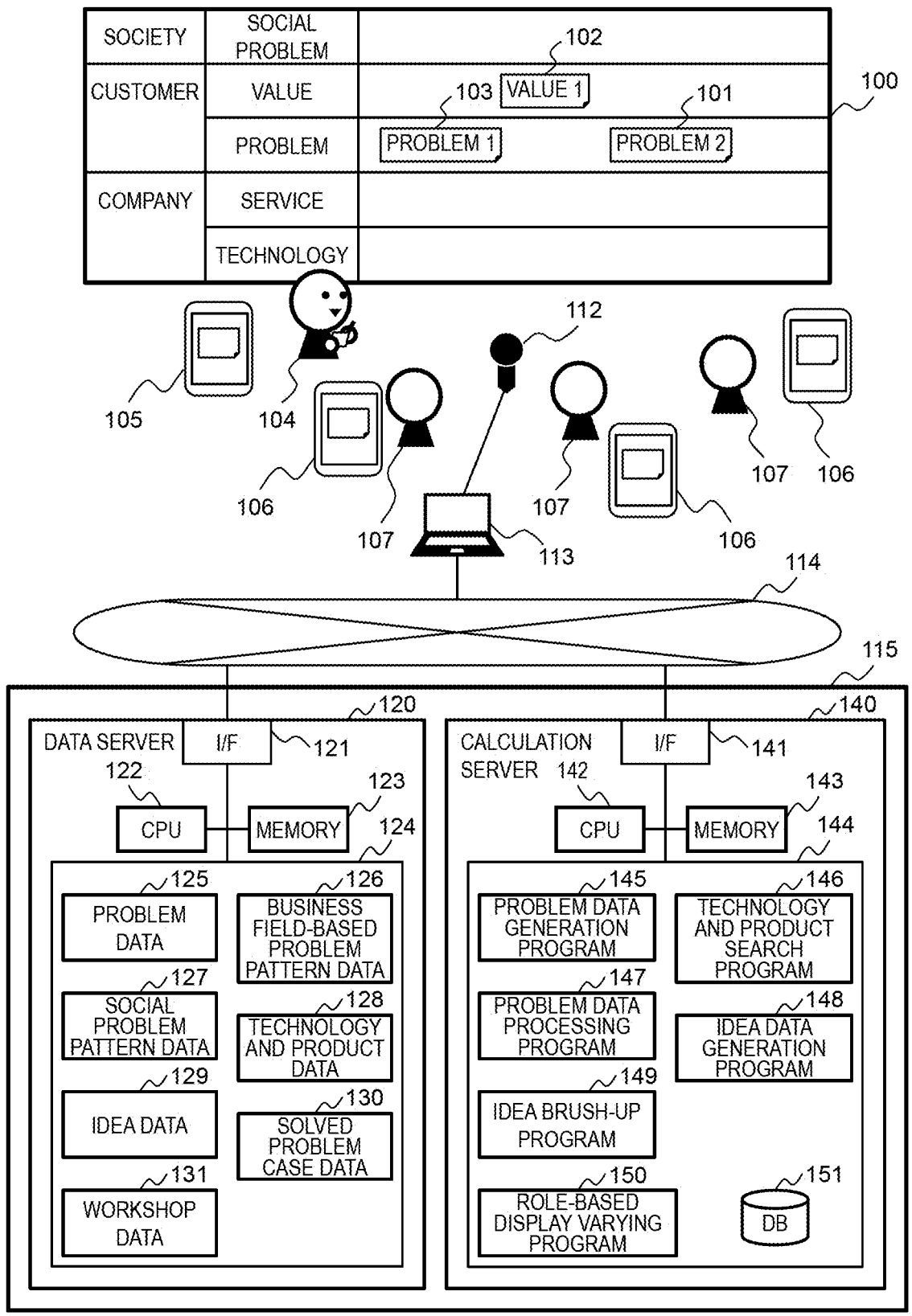
FIG. 1 is a diagram for illustrating an example of an overall configuration of the workshop assistance system.

FIG. 1 is a diagram for illustrating an example of an overall configuration of the workshop assistance system 115.

The facilitator 104 and participants 107 of the workshop are looking at a framework 100 for organizing contents of the discussion based on phases of the workshop, and are carrying a terminal 105 or terminals 106 on which information required to generate an idea by the system is displayed. The terminals 105 and 106 are, for example, tablet terminals or portable computers, and it is sufficient for the terminals 105 and 106 to have at least a function of inputting and outputting information by coupling to a network 114. Information on the participants 107 is set to the terminals 105 and 106, and contents of display on a screen can be varied depending on roles of the participants 107. The framework 100 may be presented on paper or a video display apparatus. There may be one framework 100 or more than one framework 100. The framework 100 of one type and the framework 100 of another type may be used in combination. A display example of the framework 100 is described later with reference to FIG. 25.

An audio collection apparatus 112 is further provided in order to record contents of a discussion held during the workshop. The audio collection apparatus 112 may be configured so that the facilitator 104 and the participants 107 each hold one microphone, or may be configured so that a plurality of microphones configured to collect people's audio are housed in one casing. When the microphones of the audio collection apparatus 112 are housed in one casing, an utterer may be identified with the use of a technology of recognizing an utterer, or with the use of directional microphones from a direction of the utterer. Contents of the utterance may be weighted by a magnitude based on the role of the identified utterer. An AI speaker capable of interactive conversation may be employed for the audio collection apparatus 112. The audio collection apparatus 112 may also be configured so as to use a combination of a microphone held by the facilitator 104 and microphones housed in one casing to be used by the participants. The audio collection apparatus 112 uses a general computer 113 to transmit collected audio data over the network 114 to the workshop assistance system 115.

Information generated by this system is transmitted to the terminal 105 via the network 114 and the computer 113 as well.

The workshop assistance system 115 is a computer system that includes a data server 120 and a calculation server 140, and serves as the executor of a workshop assistance method of the at least one embodiment. Of the above-mentioned components, the data server 120 is a general server apparatus, and includes a central processing unit (CPU) 122, a memory 123, which is a storage apparatus including a RAM or a similar volatile storage element, a network interface 121, and an auxiliary storage apparatus 124.

The CPU 122 operates in accordance with a program stored in the memory 123 to provide required functions as an arithmetic apparatus. The network interface 121 is an apparatus configured to handle communication processing in communication to and from the computer 113, which communicates the audio data, and the terminals 105 and 106 for viewing a recommendation screen, by coupling to the network 114. The auxiliary storage apparatus 124 is a storage apparatus including an appropriate non-volatile storage element, for example, a solid state drive (SSD) or a hard disk drive. The auxiliary storage apparatus 124 holds problem data 125, business field-based problem pattern data 126, social problem pattern data 127, technology and product data 128, idea data 129, solved problem case data 130, and workshop data 131. Those pieces of data are stored in the auxiliary storage apparatus 124 in a database format.

The problem data 125 is obtained by recording, with the audio collection apparatus 112, utterances of the facilitator 104 and participants 107 of the workshop on a problem-by-problem basis with regards to problems being discussed, converting the recorded contents of the discussion into text by a speech recognition technology, and storing the text and information on a title given to each problem. Details of the problem data 125 are described later with reference to FIG. 11.

The business field-based problem pattern data 126 is configured to store a problem common to a business field, for example, the manufacturing industry, the financial industry, or the healthcare industry, for each business operation process. Details of the business field-based problem pattern data 126 are described later with reference to FIG. 12.

The social problem pattern data 127 is configured to store a social problem and details thereof, as well as a key performance indicator (KPI) designed to solve the problem. Details of the social problem pattern data 127 are described later with reference to FIG. 13.

The technology and product data 128 is configured to store a name of a technology or a product, an outline of the technology or the product, a solved problem, an effect, and other types of information. Details of the technology and product data 128 are described later with reference to FIG. 14.

The idea data 129 is configured to store a name and details of an idea thought of in a workshop, a conceptor, a solved problem, a product and technology that is made use of, and other types of information. Details of the idea data 129 are described later with reference to FIG. 15.

The solved problem case data 130 is configured to store information about a case in which a problem has been solved, for example, the case's name, business field category, outline, and problem, and a technology that has been made use of. Details of the solved problem case data 130 are described later with reference to FIG. 16.

The workshop data 131 is configured to store a category of a business field in which a theme of a workshop is found, and information (a name, a role, and the like) on participants of the workshop. Details of the workshop data 131 are described later with reference to FIG. 17.

The data 125 to data 131 described above may be stored in the single auxiliary storage apparatus 124, or may be stored by being divided among a plurality of storage apparatus. The same applies to the calculation server 140 described below.

Some processing executed by the CPU 122 by running a program may be executed by another arithmetic apparatus (for example, a field-programmable gate array (FPGA)) or by hardware, for example, an application-specific integrated circuit (ASIC).

A program executed by the CPU 122 is provided to the data server 120 via a removable medium (a CD-ROM, a flash memory, or the like) or a network and is stored in the non-volatile auxiliary storage apparatus 124, which is a non-transitory storage medium. It is therefore recommended for the data server 120 to include an interface for reading data from a removable medium.

The data server 120 is a computer system physically configured on a single computer, or configured on a plurality of logically or physically configured computers. The data server 120 may perform processing in different threads on the same computer, or may perform processing on a virtual computer built from a plurality of physical computer resources.

The calculation server 140 is a general server apparatus, and includes a central processing unit (CPU) 142, a memory 143, which is a storage apparatus including a RAM or a similar volatile storage element, a network interface 141, and an auxiliary storage apparatus 144. The calculation server 140 holds a problem data generation program 145, a technology and product search program 146, a problem data processing program 147, an idea brush-up program 149, and a role-based display varying program 150. The calculation server 140 selectively executes those programs as required, to thereby implement corresponding functions.

The problem data generation program 145 is a program for generating the problem data 125 from contents of a discussion about a problem in response to a trigger for ending a discussion that includes a problem number. A procedure of processing executed by the problem data generation program 145 is described later with reference to FIG. 5.

The technology and product search program 146 is a program for calculating a degree of similarity between the idea data 129 and the technology and product data 128, or calculating, by using audio input of "Are there technologies or products related to this idea?" or a similar utterance as a trigger, a degree of similarity between contents of a discussion right before the trigger and the technology and product data 128, and presenting a technology or a product that has a high degree of similarity to workshop participants. A procedure of processing executed by the technology and product search program 146 is described later with reference to FIG. 8.

The problem data processing program 147 is a program for calculating a degree of similarity, to the problem data 125, of one of the business field-based problem pattern data 126, the solved problem case data 130, the technology and product data 128, and the social problem pattern data 127 that is determined by information serving as a trigger, and presenting an item high in degree of similarity to the facilitator 104 and participants 107 of the workshop. A procedure of processing executed by the problem data processing program 147 is described later with reference to FIG. 6A and FIG. 6B.

The idea brush-up program 149 is a program for displaying a case, a technology or a product, a social problem, a discussed problem, or the like in response to an utterance spoken by the facilitator 104 when the facilitator 104 wants a brush-up on an idea proposed by the participants 107 of the workshop. A procedure of processing executed by the idea brush-up program 149 is described later with reference to FIG. 9.

The role-based display varying program 150 is a program for varying display contents depending on roles of the participants 107 of the workshop. A procedure of processing executed by the role-based display varying program 150 is described later with reference to FIG. 10.

The calculation server 140 holds those programs in a database 151 in advance, and the CPU 142 reads the programs out of the memory 143 to serve as processing modules configured to execute the various types of processing. In the following description, the actor of processing described in a sentence that has a program as its subject is actually the CPU 142, which executes the program, and the subject may be replaced with the CPU 142.

The network interface 141 is an interface for coupling to the data server 120 via a network (not shown), or via the network 114.

The database 151 is configured on the auxiliary storage apparatus 144, and may store the same data as the data stored in the auxiliary storage apparatus 124 of the data server 120. When executing a program, the calculation server 140 reads data to be analyzed out of the data server 120, temporarily stores the data in the memory 143, and implements various functions by executing processing with the CPU 142.

Results of the processing executed by the calculation server 140 are displayed on the terminals 105 and 106, to which results are output, via the network interface 141.

Some processing executed by the CPU 142 by running a program may be executed by another arithmetic apparatus (for example, a field-programmable gate array (FPGA)) or by hardware, for example, an application-specific integrated circuit (ASIC).

A program executed by the CPU 142 is provided to the calculation server 140 via a removable medium (a CD-ROM, a flash memory, or the like) or a network and is stored in the non-volatile auxiliary storage apparatus 144, which is a non-transitory storage medium. It is therefore recommended for the calculation server 140 to include an interface for reading data from a removable medium.

The calculation server 140 is a computer system physically configured on a single computer, or configured on a plurality of logically or physically configured computers. The calculation server 140 may perform processing in different threads on the same computer, or may perform processing on a virtual computer built from a plurality of physical computer resources.

In the example described above, the data server 120 and the calculation server 140 are separate servers in the configuration illustrated in FIG. 1. The two servers, however, may be a single server, or a system in which separate servers store different types of data and execute different programs may be employed.

In the mode described above, the facilitator 104 and the participants 107 carry the terminal 105 and the terminals 106, respectively, on which results are viewed. However, a video apparatus on which information can be shared by all may be utilized. Possible examples of the video apparatus include a large-sized touch panel display and an interactively operable projector having an operation detection function.

Actual procedures in the at least one embodiment are described below with reference to the drawings.

FIGS. 2, 3A, 3B, 4 are diagrams for illustrating an example of information exchange among the facilitator 104 and participants 107 of the workshop, the workshop assistance system 115, and the data server 120, as well as a processing flow. The following description takes information by audio input as a typical example, but other forms of utterance and information input on a terminal screen may also be used.

Figure 2:
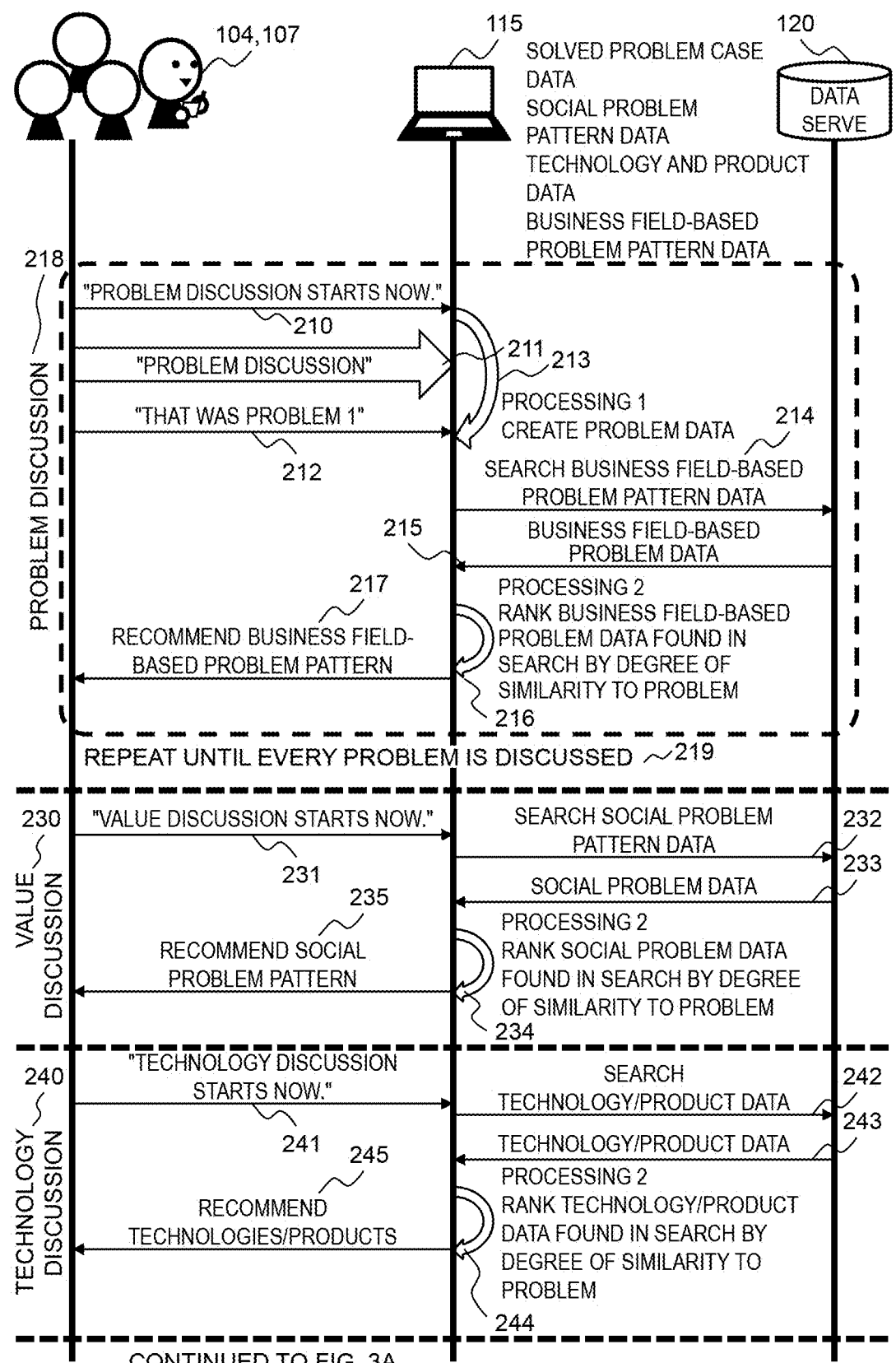
FIGS. 2, 3A, 3B and 4 are overall flowcharts of the workshop assistance system.
Figure 3A:
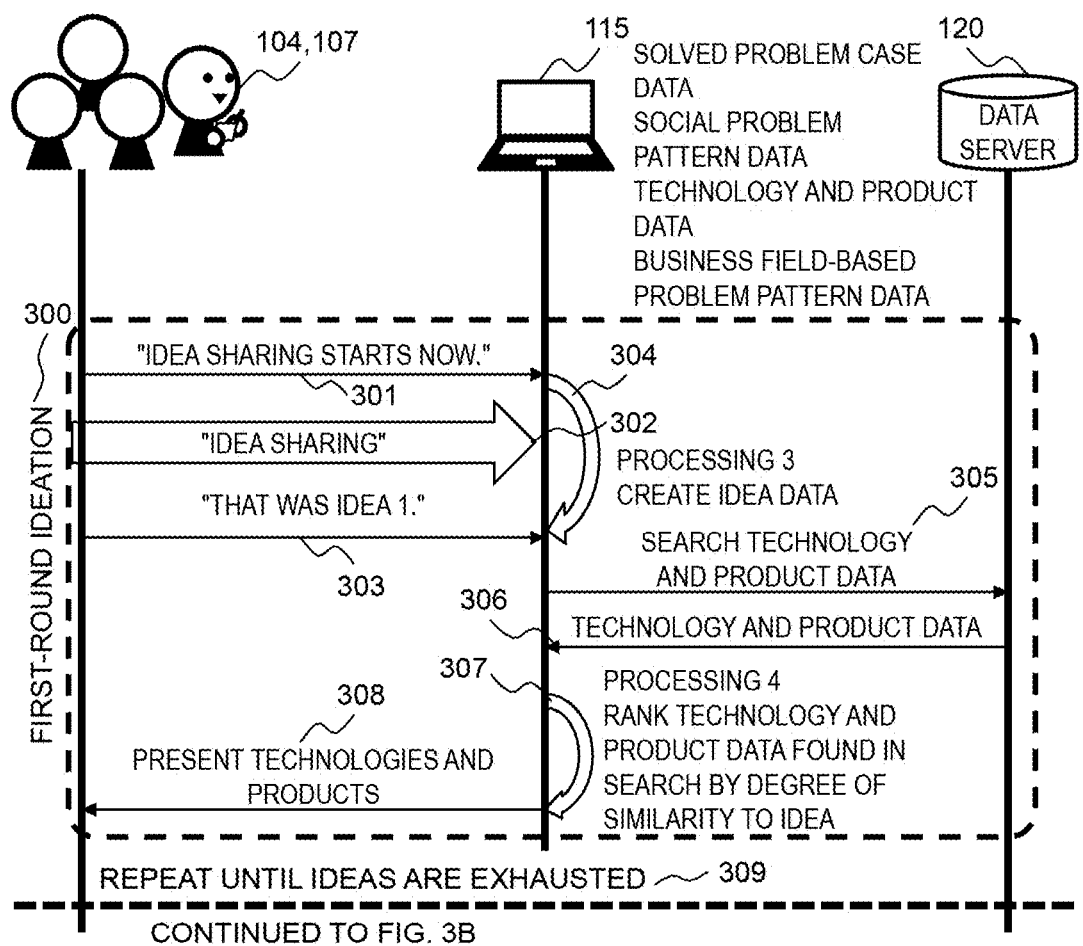
Figure 3B:
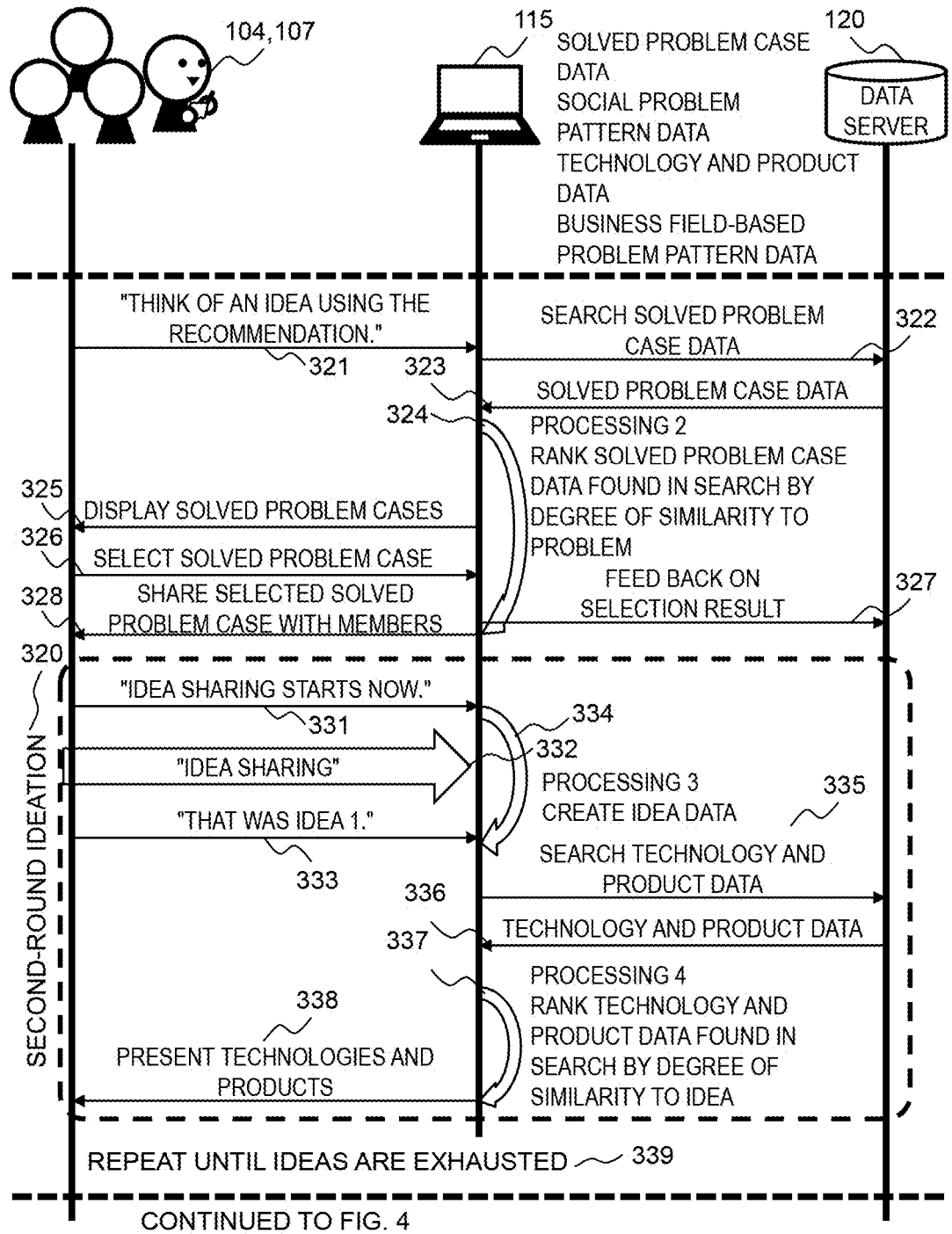
Figure 5:
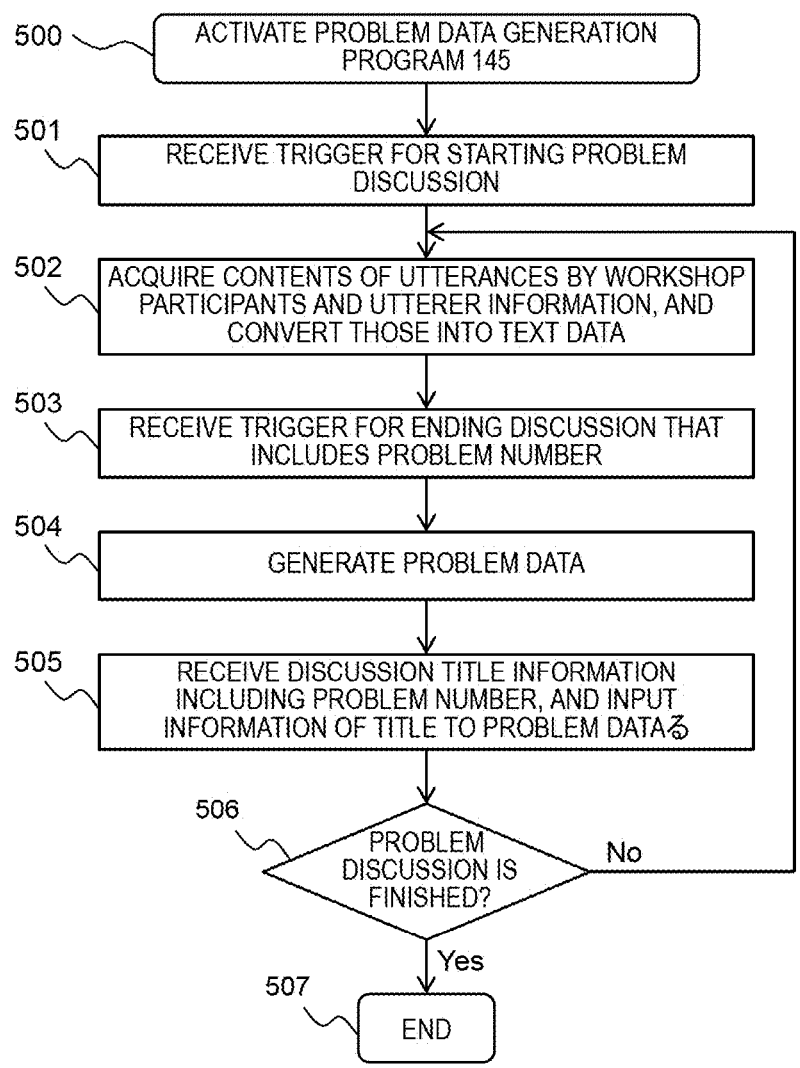
FIG. 5 is a flowchart of an example of processing of the problem data generation program.

As illustrated in FIG. 2, the workshop assistance system 115 first recognizes a start of a problem discussion 218 by acquiring predetermined input (for example, audio information that is "Problem discussion starts now." 210 by the facilitator 104), and the problem data generation program 145 then starts Processing 1 (213, illustrated in FIG. 5). The workshop assistance system 115 next acquires contents of the problem discussion by the participants 107 as audio data (211). At an end of the discussion, the workshop assistance system 115 acquires predetermined input (audio information of a specific keyword including a problem number, for example, "That was Problem 1." 212 by the facilitator 104) as a trigger for ending the discussion. This prompts generation of the problem data 125.

The workshop assistance system 115 next searches the business field-based problem pattern data 126, with text data 1104 of the problem data 125 as a keyword (214), to acquire business field-based problem pattern data similar to the problem (215). It is recommended for the workshop assistance system 115 to create, in the search, a search query including words that are obtained by breaking the text data 1104 of the problem data 125 into parts with a morphological analysis technology or the like. The workshop assistance system 115 may search a problem 1205 of the business field-based problem pattern data 126, or may search the entire business field-based problem pattern data 126.

Figure 6A:
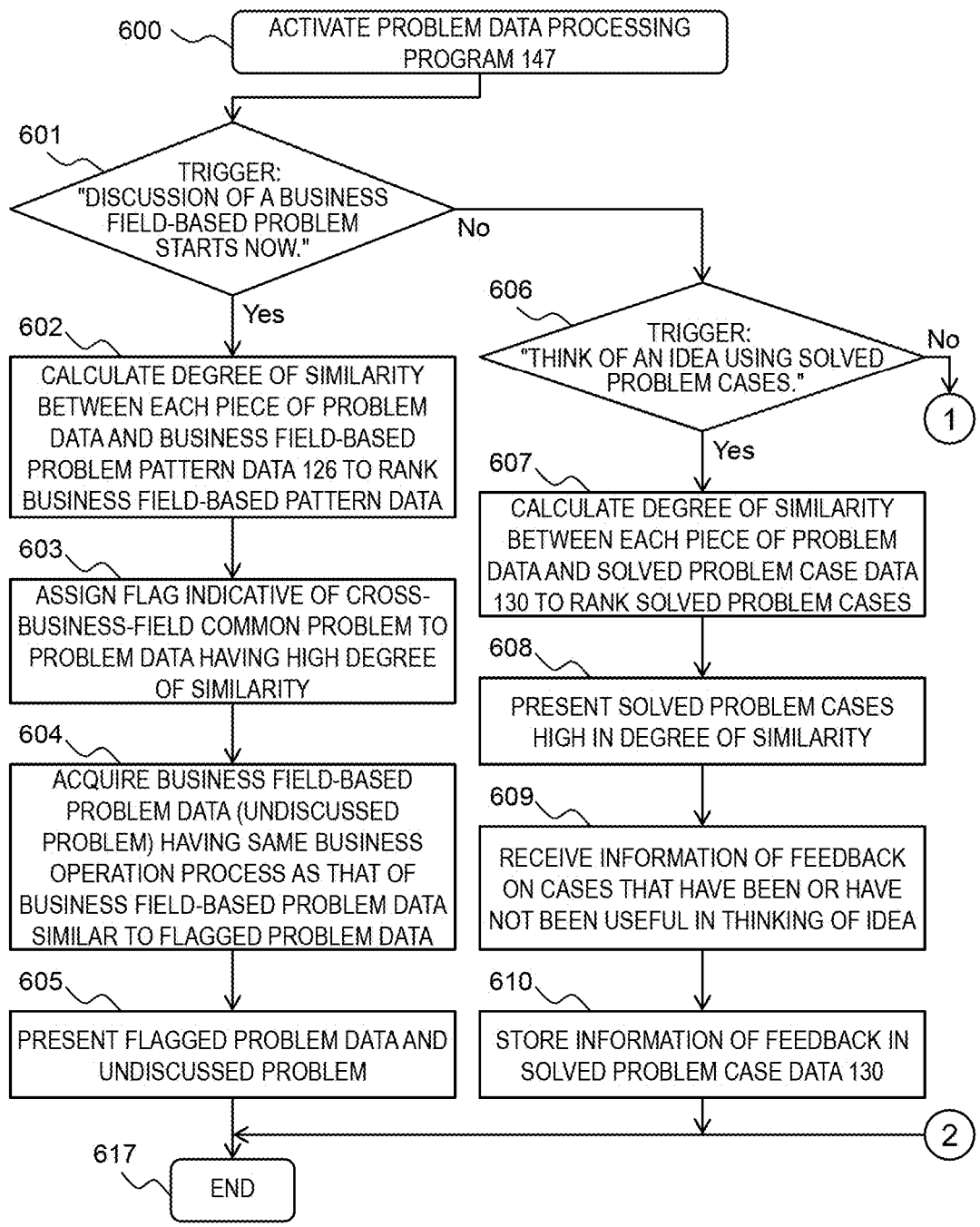
FIGS. 6A and 6B are flowcharts for illustrating an example of processing of the problem data processing program.
Figure 6B:
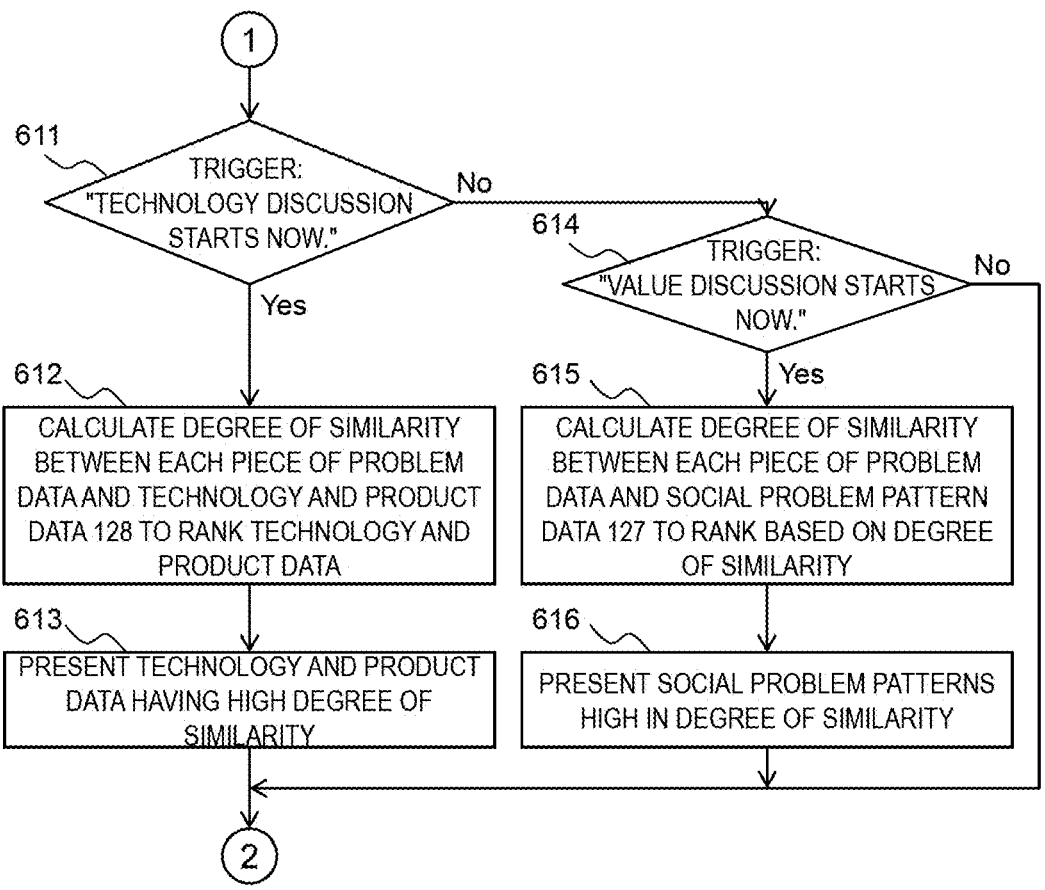

When acquiring predetermined input (for example, audio information that is "Discussion of business field-based problems starts now." by the facilitator 104), the workshop assistance system 115 executes the problem data processing program 147 (Processing 2) to process the acquired business field-based problem data and the problem data (216, illustrated in FIG. 6A and FIG. 6B). The workshop assistance system 115 uses, for example, a screen illustrated in FIG. 18 to present recommendation on the business field-based problem data to the facilitator 104 and the participants 107 based on a result of ranking by the problem data processing program 147 (217). The workshop assistance system 115 repeats the processing from 211 to 217 until every problem is discussed (219).

The workshop assistance system 115 subsequently acquires predetermined input (for example, audio information that is "Value discussion starts now." 231 by the facilitator 104), and recognizes a start of a value discussion 230. The workshop assistance system 115 then searches the social problem pattern data 127 with the text data 1104 of the problem data 125 as a keyword (232) to acquire social problem data similar to the problem (233). It is recommended for the workshop assistance system 115 to create, in the search, a search query including words that are obtained by breaking the text data 1104 of the problem data 125 into parts with a morphological analysis technology or the like.

The workshop assistance system 115 may search problem details 1303 of the social problem pattern data 127, or may search the entire social problem pattern data 127. A thesaurus in which synonyms of various words are organized may be used in the search. The problem data processing program 147 next starts Processing 2 (234, illustrated in FIG. 6A and FIG. 6B).

Figure 19:
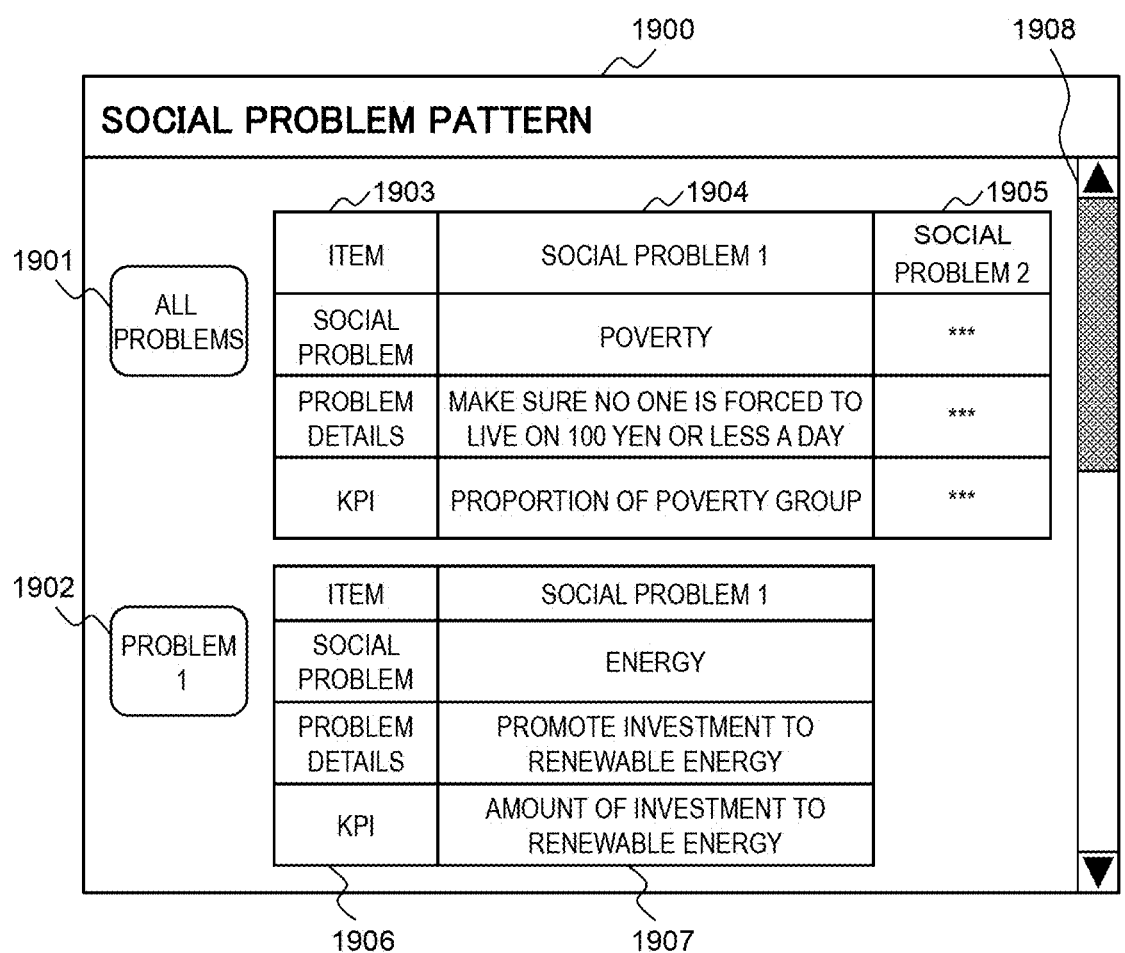
FIG. 19 is a diagram for illustrating an example of a social problem pattern display screen.

The workshop assistance system 115 then uses, for example, a screen illustrated in FIG. 19 to present the social problem data to the facilitator 104 and the participants 107 based on a result of ranking by the problem data processing program 147 (235). The social problem data may be displayed one problem at a time, or may be presented for the entire problem discussion.

The workshop assistance system 115 subsequently acquires predetermined input (for example, audio information that is "Technology discussion starts now." 241 by the facilitator 104), and recognizes a start of a technology discussion 240. The workshop assistance system 115 then searches the technology and product data 128 with the text data 1104 of the problem data 125 as a keyword (242) to acquire technology and product data corresponding to the problem (243). It is recommended for the workshop assistance system 115 to create, in the search, a search query including words that are obtained by breaking the text data 1104 of the problem data 125 into parts with a morphological analysis technology or the like. The workshop assistance system 115 may search a problem 1405 of the technology and product data 128, or may search the entire technology and product data 128. A thesaurus in which synonyms of various words are organized may be used in the search. The problem data processing program 147 next starts Processing 2 (244, illustrated in FIG. 6A and FIG. 6B).

Figure 20:
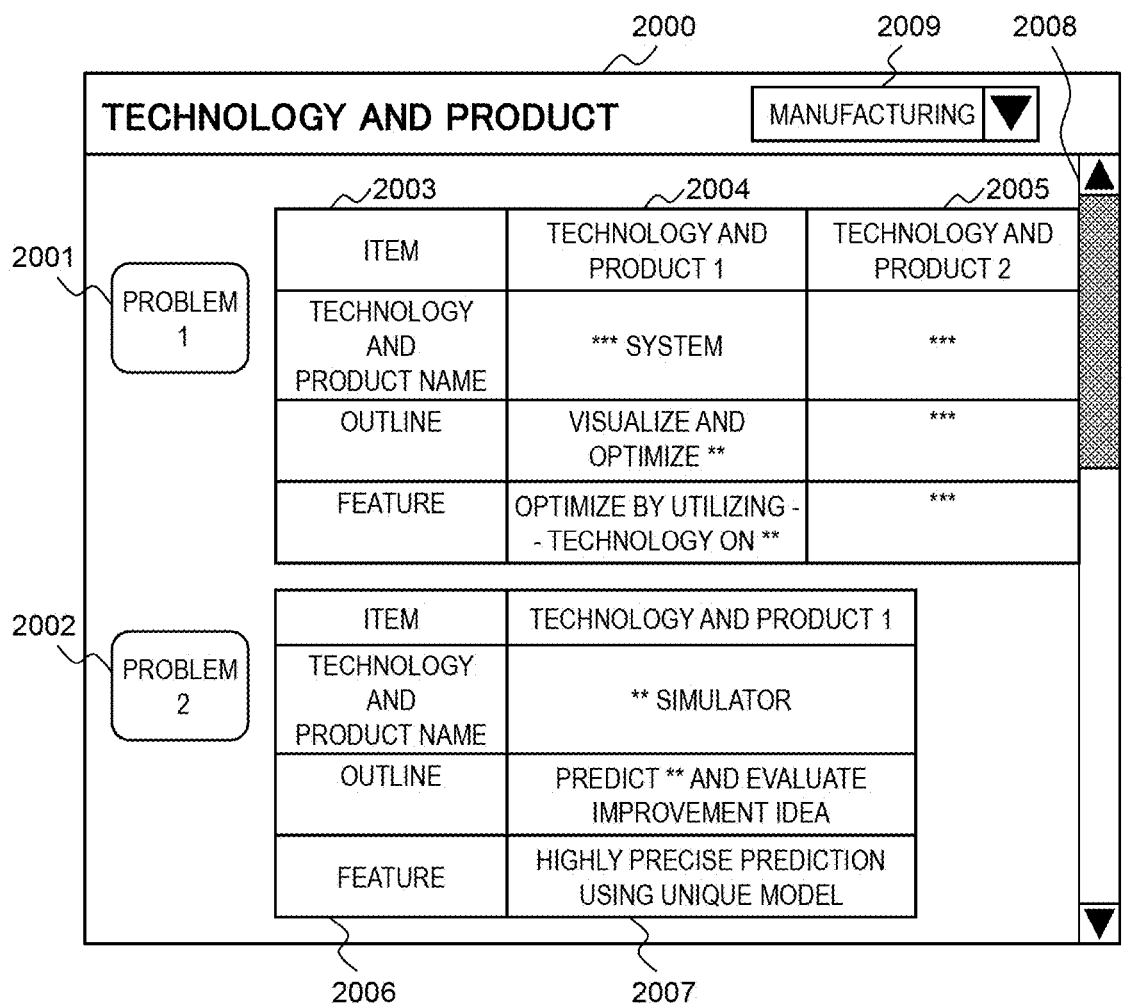
FIG. 20 is a diagram for illustrating an example of a technology and product display screen.

The workshop assistance system 115 then uses, for example, a screen illustrated in FIG. 20 to present recommendation on technologies and products to the facilitator 104 and the participants 107 based on a result of ranking by the problem data processing program 147 (245).

As illustrated in FIG. 3, the workshop assistance system 115 subsequently recognizes a start of first-round ideation 300 by acquiring predetermined input (for example, audio information that is "Idea sharing starts now." 301 by the facilitator 104), and an idea data generation program 148 then starts Processing 3 (304, illustrated in FIG. 7). The workshop assistance system 115 next acquires contents of the idea sharing by the participants 107 as audio data (302). At an end of the discussion, the workshop assistance system 115 acquires predetermined input (audio information of a specific keyword including an idea number, for example, "That was Idea 1." 303 by the facilitator 104) as a trigger for ending the discussion. This prompts generation of the idea data 129.

The workshop assistance system 115 next searches the technology and product data 128, with text data 1507 of the idea data 129 as a keyword (305), to acquire technology and product data corresponding to the idea (306). It is recommended for the workshop assistance system 115 to create, in the search, a search query including words that are obtained by breaking the text data 1507 of the idea data 129 into parts with a morphological analysis technology or the like. The workshop assistance system 115 may search the problem 1405 of the technology and product data 128, may search an outline 1404, the problem 1405, and a feature 1406, or may search the entire technology and product data 128. A thesaurus in which synonyms of various words are organized may be used in the search.

Figure 8:
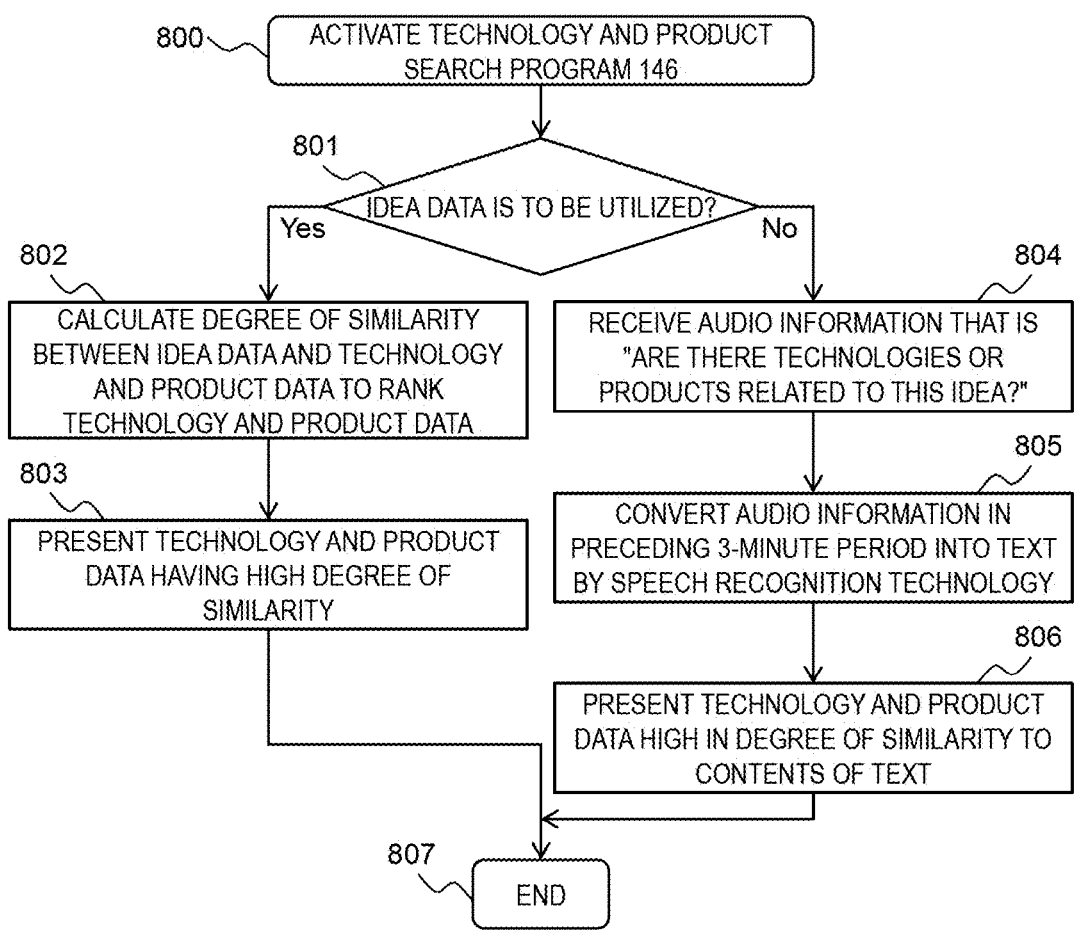
FIG. 8 is a flowchart for illustrating an example of processing of the technology and product search program.

The workshop assistance system 115 executes the technology and product search program 146 (Processing 4) to process the acquired technology and product data and the problem data (307, illustrated in FIG. 8). The workshop assistance system 115 uses, for example, a screen illustrated in FIG. 21 to present recommendation on the technology and product to the facilitator 104 and the participants 107 based on a result of ranking by the technology and product search program 146 (308). The workshop assistance system 115 repeats the processing from 301 to 308 until every problem is discussed (309).

In the processing described above, the audio input of "That was Idea 1." by the facilitator 104 is required at the end of the idea discussion in order to structure contents of the discussion on an idea-by-idea basis. Another method may be processing of converting audio information during a period that precedes input of audio information that is "Are there technologies or products related to this idea?" by a length of time (for example, 3 minutes) set in advance into text as the contents of the discussion. This method is unusable for idea-by-idea structuration, for example, Idea 1 and Idea 2, but enables limiting acquisition of information on technologies and products only to an idea that interests the facilitator 104.

The workshop assistance system 115 next searches the solved problem case data 130, with text data 1104 of the problem data 125 as a keyword (322), to acquire solved problem case data corresponding to the problem (323). It is recommended for the workshop assistance system 115 to create, in the search, a search query including words that are obtained by breaking the text data 1104 of the problem data 125 into parts with a morphological analysis technology or the like. The workshop assistance system 115 may search a problem 1605 of the solved problem case data 130, or may search the entire solved problem case data 130. A thesaurus in which synonyms of various words are organized may be used in the search.

The workshop assistance system 115 subsequently acquires predetermined input (for example, audio information that is "Think of an idea using the recommendation." 321 by the facilitator 104), and recognizes a start of second-round ideation 320, at which point the problem data processing program 147 starts Processing 2 (324, illustrated in FIG. 6A and FIG. 6B). The workshop assistance system 115 then uses, for example, a screen illustrated in FIG. 23 to present solved problem cases to the facilitator 104 based on a result of ranking by the problem data processing program 147 (325). The facilitator 104 selects an appropriate case from the presented solved problem cases, and the workshop assistance system 115 acquires information of the selection by the facilitator 104 (326). A feedback in the form of, for example, an increment in the number of times of selection as the solved problem case data 130 is fed back to the selected solved problem case (327). Other than the feedback that increases a score, a feedback that decreases a score may be included. The workshop assistance system 115 may be designed so that a positive number or negative number by which a score is to be increased or decreased is input as a feedback. The workshop assistance system 115 may also be designed so that the participants 107 can input a feedback as well. In this case, points indicated in the feedback as an amount by which a score is to be increased or decreased may be varied depending on the roles of the participants 107.

The selected solved problem case is then presented to the participants 107 (328). Looking at the solved problem case, the participants 107 develop an idea. Next, the same processing as 301 to 309 is executed as the second round of ideation (330 to 336).

Figure 4:
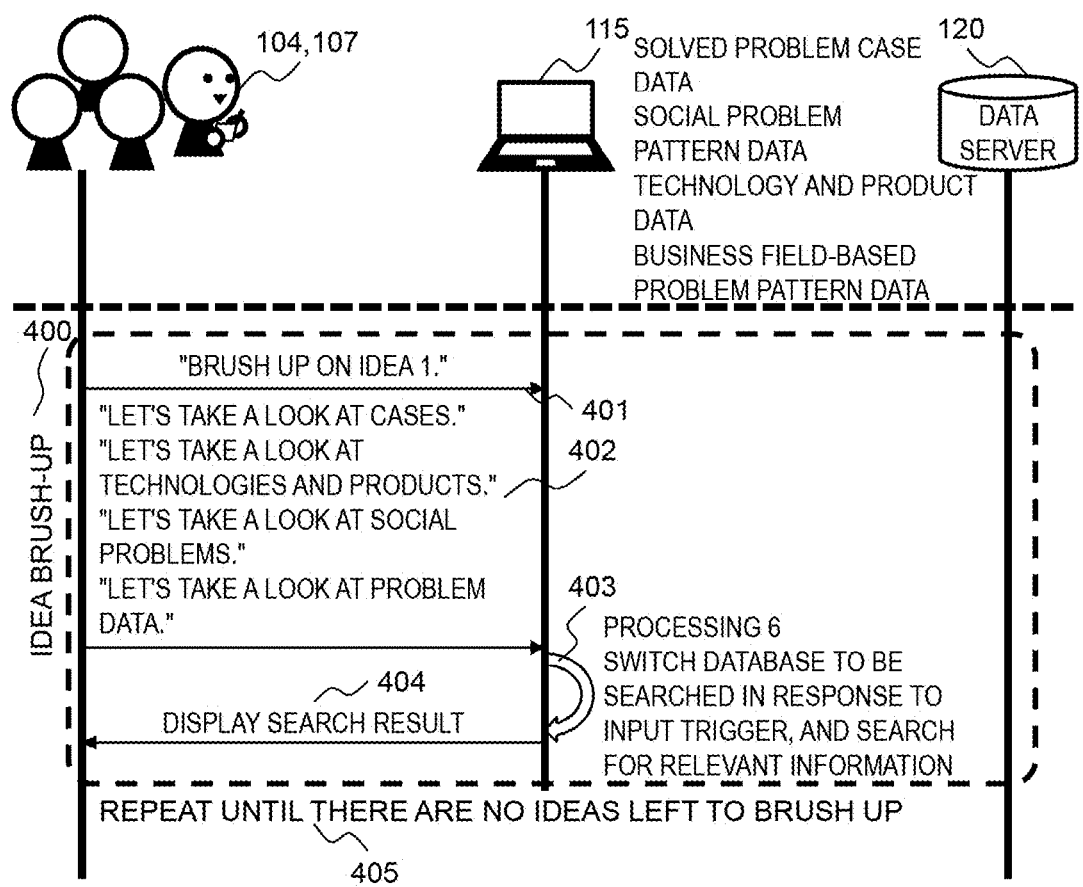

As illustrated in FIG. 4, the workshop assistance system 115 subsequently acquires predetermined input (for example, audio information that is "Brush up on Idea 1." 401 by the facilitator 104), and recognizes a start of an idea brush-up 400, at which point the idea brush-up program 149 starts Processing 6 (403, illustrated in FIG. 9). Next, the workshop assistance system 115 acquires predetermined input (for example, audio information 402, which serves as a trigger), selects processing required by the idea brush-up program 149, and executes the processing. The workshop assistance system 115 presents search results to the facilitator 104 and the participants 107 based on results of calculation of the degrees of similarity by the idea brush-up program 149 (404). The workshop assistance system 115 repeats the processing from 401 to 404 until brushing up of every idea is finished (405).

FIG. 5 is a flowchart for illustrating an example of processing of the problem data generation program 145.

The problem data generation program 145 has been active since the time of activation of the workshop assistance system 115, and is waiting for a trigger for starting a problem discussion (Step 500).

The problem data generation program 145 (the CPU 142) receives the trigger for starting a discussion about a problem (Step 501). The trigger may be, for example, audio input of "Problem discussion starts now." by the facilitator 104, or the facilitator's operation of the terminal 105.

The problem data generation program 145 next collects contents of the discussion held among the facilitator 104 and the participants 107 with the audio collection apparatus 112, and converts collected audio data into text data by a speech recognition technology (Step 502). In this step, text data with information on an utterer added thereto is generated when the audio collection apparatus 112 can identify the utterer.

The problem data generation program 145 next receives the trigger for ending a discussion that includes a problem number (Step 503). The trigger may be, for example, audio input of "That was Problem 1." by the facilitator 104, or the facilitator's operation of the terminal 105.

The problem data generation program 145 next generates problem data from the text data converted from the audio data of the contents of the discussion (Step 504).

The problem data generation program 145 next receives discussion title information including a problem number via an utterance of the facilitator 104, and inputs information of a problem title 1105 to the problem data 125 (Step 505).

When the problem discussion is not finished, the problem data generation program 145 next returns to Step 502 to create next problem data (Step 506). When a trigger for executing another program is detected, on the other hand, the problem data generation program 145 determines that the problem discussion has been finished, and ends the processing of the problem data generation program 145 (Step 507). The problem data generation program 145 may be ended by predetermined audio information or operation on the terminal 105.

FIGS. 6A and 6B are flowcharts for illustrating an example of processing of the problem data processing program 147.

The problem data processing program 147 has been active since the time of activation of the workshop assistance system 115, and is waiting for a trigger for starting the processing depending on the type of processing of the problem data (Step 600).

The problem data processing program 147 (the CPU 142) refers to the business field-based problem pattern data 126 to determine whether to process the problem data (Step 601). The determination may be based on, for example, audio input of "Discussion of business field-based problems starts now." by the facilitator 104, or the facilitator's operation of the terminal 105. When the determination of Step 601 is "Yes", the problem data processing program 147 calculates the degree of similarity between the problem data and the business field-based problem pattern data 126 to rank pieces of business field-based problem data (Step 602). The degree of similarity can be calculated with the use of a general information search algorithm for text (for example, TF-IDF). Importance of a word included in text is evaluated from the frequency of appearance of the word, and the degree of similarity of the text is calculated based on the importance. In another employable method, Doc2Vec or Word2Vec is used to vectorize text, and cosine similarity between vectors is calculated. The text used in the calculation of the degree of similarity may be the entire problem data or may be a part (for example, only a problem part) of the problem data. A thesaurus in which synonyms of various words are organized may be used in the calculation of the degree of similarity.

Next, the problem data processing program 147 assigns, to a piece of problem data having a degree of similarity that is higher than a predetermined threshold value or that is higher in rank than a predetermined rank, a flag indicating that a problem represented by the piece of problem data is a cross-business-field common problem (Step 603), because the problem represented by such problem data is a business operation problem in other business fields as well. The problem data processing program 147 next searches for business field-based problem data having the same business operation process as that of business field-based problem data similar to the piece of problem data with the flag assigned thereto, and acquires the found business field-based problem data as a problem that has not been discussed (Step 604). The problem data processing program 147 next presents the piece of problem data with the flag assigned thereto and the problem that has not been discussed (cross-business-field common problem data) to the facilitator 104 and the participants 107 (Step 605), and ends the processing (Step 617).

When the determination of Step 601 is "No", on the other hand, the problem data processing program 147 refers to the solved problem case data 130 to determine whether to process the problem (Step 606). The determination may be based on, for example, audio input of "Think of an idea using solved problem cases." by the facilitator 104, or the facilitator's operation of the terminal 105. When the determination of Step 606 is "Yes", the problem data processing program 147 calculates the degree of similarity between the problem data and the solved problem case data 130 to rank solved problem cases (Step 607). The calculation of the degree of similarity in Step 607 may use the same method as the method in Step 602 described above.

The problem data processing program 147 next presents a piece of solved problem case data having a degree of similarity that is higher than a predetermined threshold value or that is higher in rank than a predetermined rank to the facilitator 104 and the participants 107 (Step 608). Next, the facilitator 104 and the participants 107 use the terminals to input a feedback on a solved problem case that has been or has not been useful in thinking of an idea. The problem data processing program 147 receives information of the feedback (Step 609). The problem data processing program 147 next stores the information of the feedback in the solved problem case data 130 (Step 610). The information of the feedback can be utilized to, for example, present only solved problem cases that are scored high in the feedback in presentation of solved problem cases. The processing is then ended (Step 617).

When the determination of Step 606 is "No", on the other hand, the problem data processing program 147 refers to the technology and product data 128 to determine whether to process the problem (Step 611). The determination may be based on, for example, audio input of "Technology discussion starts now." by the facilitator 104, or the facilitator's operation of the terminal 105. When the determination of Step 611 is "Yes", the problem data processing program 147 calculates the degree of similarity between the problem data and the technology and product data 128 to rank pieces of technology and product data (Step 612). The calculation of the degree of similarity in Step 612 may use the same method as the method in Step 602 described above.

The problem data processing program 147 next presents a piece of technology and product data having a degree of similarity that is higher than a predetermined threshold value or that is higher in rank than a predetermined rank to the facilitator 104 and the participants 107 (Step 613), and ends the processing (Step 617).

When the determination of Step 611 is "No", on the other hand, the problem data processing program 147 refers to the social problem pattern data 127 to determine whether to process the problem (Step 614). The determination may be based on, for example, audio input of "Value discussion starts now." by the facilitator 104, or the facilitator's operation of the terminal 105. When the determination of Step 614 is "Yes", the problem data processing program 147 calculates the degree of similarity between the problem data and the social problem pattern data 127 to rank pieces of social problem data (Step 615). In this step, the degree of similarity to the social problem pattern data may be calculated for each piece of problem data, or a degree of similarity between text information of all pieces of problem data and the social problem pattern data may be calculated. The calculation of the degree of similarity in Step 615 may use the same method as the method in Step 602 described above.

The problem data processing program 147 next presents a piece of social problem data having a degree of similarity that is higher than a predetermined threshold value or that is higher in rank than a predetermined rank to the facilitator 104 and the participants 107 (Step 616), and ends the processing (Step 617).

Figure 7:
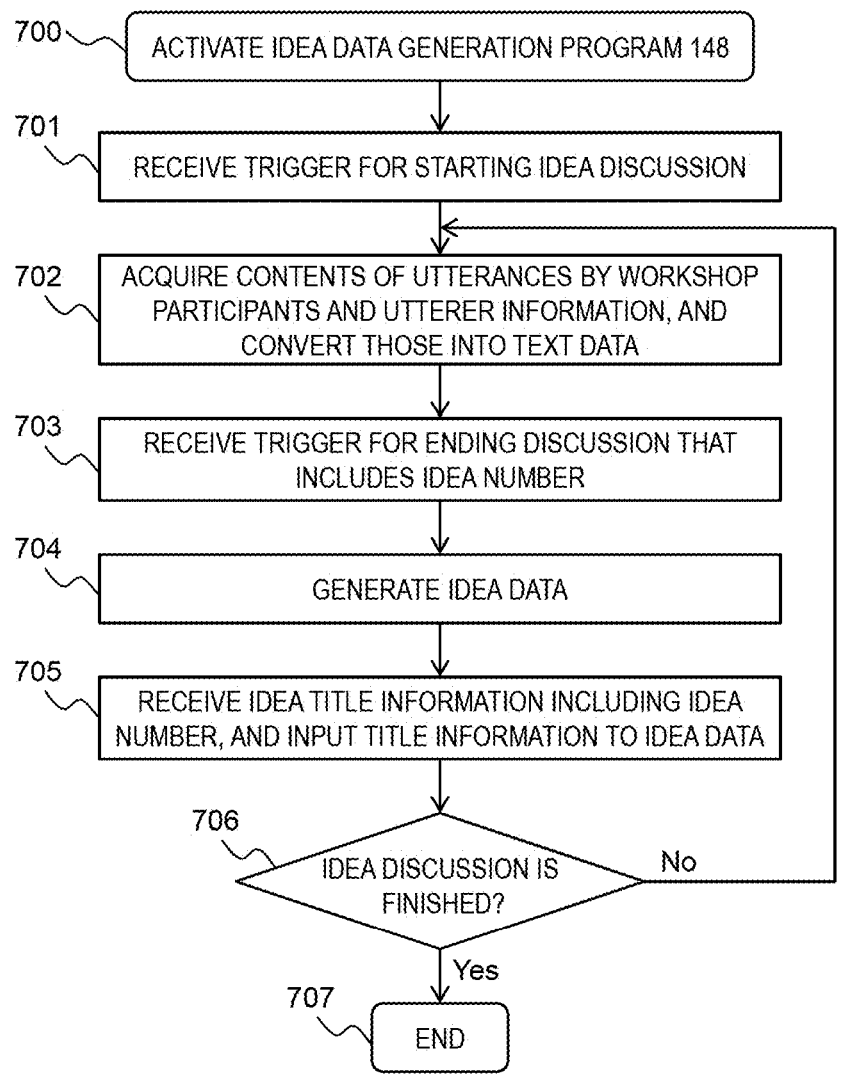
FIG. 7 is a flowchart for illustrating an example of processing of the idea data generation program.

FIG. 7 is a flowchart for illustrating an example of processing of the idea data generation program 148.

The idea data generation program 148 has been active since the time of activation of the workshop assistance system 115, and is waiting for a trigger for starting a discussion of an idea (Step 700).

The idea data generation program 148 (the CPU 142) receives the trigger for starting a discussion of an idea (Step 701). The trigger may be, for example, audio input of "Idea sharing starts now." by the facilitator 104 or the facilitator's operation of the terminal 105.

The idea data generation program 148 next collects contents of an idea devised by the participants 107 with the audio collection apparatus 112, and converts collected audio data into text data by a speech recognition technology (Step 702). In this step, text data with information on an utterer added thereto is generated when the audio collection apparatus 112 can identify the utterer.

The idea data generation program 148 next receives a trigger for ending a discussion that includes an idea number (Step 703). The trigger may be, for example, audio input of "That was Idea 1." by the facilitator 104, or the facilitator's operation of the terminal 105.

The idea data generation program 148 next generates idea data from the text data converted from the audio data of the contents of the discussion (Step 704).

The idea data generation program 148 next receives title information about the idea's title that includes an idea number via an utterance of the facilitator 104, and inputs information of the title (an idea name 1504) to the idea data 129 (Step 705).

When the discussion of the idea is not finished, the idea data generation program 148 next returns to Step 702 to create next idea data (Step 706). When a trigger for executing another program is detected, on the other hand, the idea data generation program 148 determines that the discussion of the idea has been finished, and ends the processing of the idea data generation program 148 (Step 707). The idea data generation program 148 may be ended by predetermined audio information or operation on the terminal 105.

The idea data generation program 148 may create a cross-business-field thesaurus from discussions of ideas. Different terms may be used for similar matters in different business fields. In the ideation phases in which the idea data generation program 148 is executed, discussions across business fields are held and a cross-business-field thesaurus can accordingly be created by compiling terms that vary from business field to business field as synonyms. For instance, meanings of words co-occurring with the same word are presumed to be similar, and it can be deduced that the words are used in similar meanings in different business fields. Word2Vec or other technologies that vectorize a word may also be utilized to register words that are close in vector and differ in business field as a cross-business-field thesaurus. A cross-business-field thesaurus may be created by further performing the four arithmetic operations on the vectors. Although discussions in the ideation phases are most likely to be discussions across business fields, a cross-business-field thesaurus may be created in other phases.

FIG. 8 is a flowchart for illustrating an example of processing of the technology and product search program 146.

The technology and product search program 146 has been active since the time of activation of the workshop assistance system 115, and is waiting for a trigger for starting the processing (Step 800).

The technology and product search program 146 next determines whether to utilize the idea data (Step 801). Whether the idea data is to be utilized may be set to the workshop assistance system 115 in advance, or may automatically be determined depending on whether there is idea data.

When the idea data is to be utilized ("Yes" in Step 801), the technology and product search program 146 calculates the degree of similarity between the idea data and the technology and product data to rank the pieces of technology and product data (Step 802).

The technology and product search program 146 next presents a piece of technology and product data having a degree of similarity that is higher than a predetermined threshold value or that is higher in rank than a predetermined rank to the facilitator 104 and the participants 107 (Step 803). Technologies and products may be presented for each idea, or for each category of technologies and products (for example, an IoT-related category and a healthcare category), or may be presented for the entire idea discussion. The technology and product search program 146 then ends the processing (Step 807).

When the idea data is not to be utilized ("No" in Step 801), on the other hand, audio information that is "Are there technologies or products related to this idea?" by the facilitator 104 is received (Step 804). Next, audio information during a period that precedes the time of reception of the audio information in Step 804 by 3 minutes is converted into text by a speech recognition technology (Step 805). The length of the preceding period, which is 3 minutes here, may be set freely by the system. Next, a piece of technology and product data having a degree of similarity to contents of the text that is higher than a predetermined threshold value or that is higher in rank than a predetermined rank is presented to the participants 107 (Step 806). The technology and product search program 146 then ends the processing (Step 807).

Figure 9:
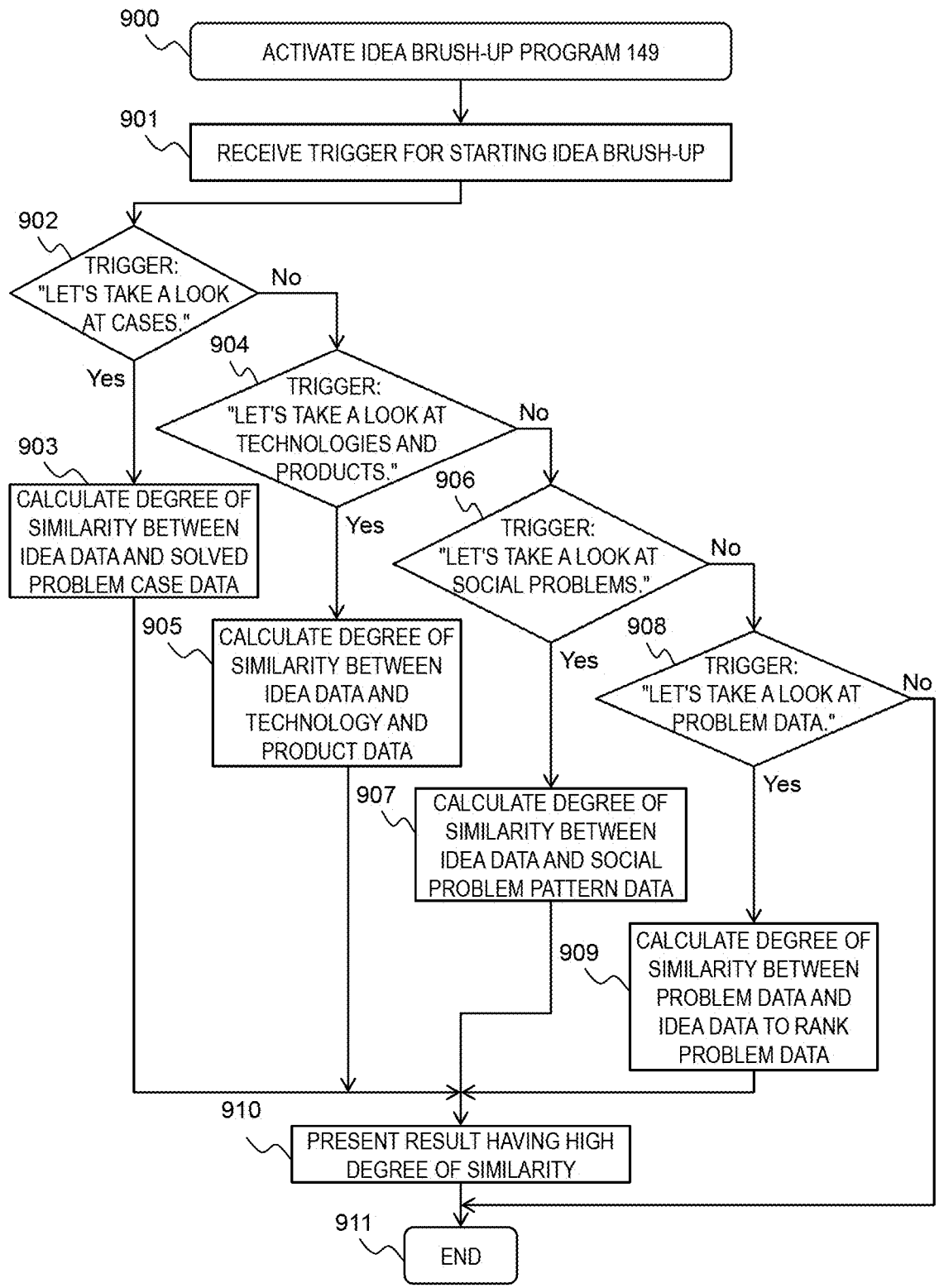
FIG. 9 is a flowchart for illustrating an example of processing of the idea brush-up program.

FIG. 9 is a flowchart for illustrating an example of processing of the idea brush-up program 149.

The idea brush-up program 149 has been active since the time of activation of the workshop assistance system 115, and is waiting for a trigger for starting the processing (Step 900).

The idea brush-up program 149 (the CPU 142) next receives the trigger for starting idea brush-up that includes an idea number (Step 901). The trigger may be, for example, audio input of "Brush up on Idea 1." by the facilitator 104, or the facilitator's operation of the terminal 105.

The idea brush-up program 149 next refers to the solved problem case data 130 to determine whether to brush up on the idea (Step 902). The determination may be based on, for example, audio input of "Let's take a look at cases." by the facilitator 104, or the facilitator's operation of the terminal 105. When the determination of Step 902 is "Yes", the idea brush-up program 149 calculates the degree of similarity between the idea data specified in Step 901 and the solved problem case data 130 (Step 903), and proceeds to Step 910.

When the determination of Step 902 is "No", on the other hand, the idea brush-up program 149 refers to the technology and product data 128 to determine whether to brush up on the idea (Step 904). The determination may be based on, for example, audio input of "Let's take a look at technologies and products." by the facilitator 104, or the facilitator's operation of the terminal 105. When the determination of Step 904 is "Yes", the idea brush-up program 149 calculates the degree of similarity between the idea data specified in Step 901 and the technology and product data 128 (Step 905).

When the determination of Step 904 is "No", the idea brush-up program 149 refers to the social problem pattern data 127 to determine whether to brush up on the idea (Step 906). The determination may be based on, for example, audio input of "Let's take a look at social problems." by the facilitator 104, or the facilitator's operation of the terminal 105. When the determination of Step 906 is "Yes", the idea brush-up program 149 calculates the degree of similarity between the idea data specified in Step 901 and the social problem pattern data 127 (Step 907).

When the determination of Step 906 is "No", the idea brush-up program 149 refers to the problem data 125 to determine whether to brush up on the idea (Step 908). The determination may be based on, for example, audio input of "Let's take a look at problem data." by the facilitator 104, or the facilitator's operation of the terminal 105. When the determination of Step 908 is "Yes", the idea brush-up program 149 calculates the degree of similarity between the idea data specified in Step 901 and the problem data 125, and determines a piece of problem data to which the idea data is related to rank the piece of problem data (Step 909).

After the processing of Step 903, Step 905, Step 907, or Step 909 is finished, the idea brush-up program 149 presents a result having a degree of similarity that is higher than a predetermined threshold value or that is higher in rank than a predetermined rank to the facilitator 104 and the participants 107 (Step 910), and ends the processing (Step 911).

Figure 10:
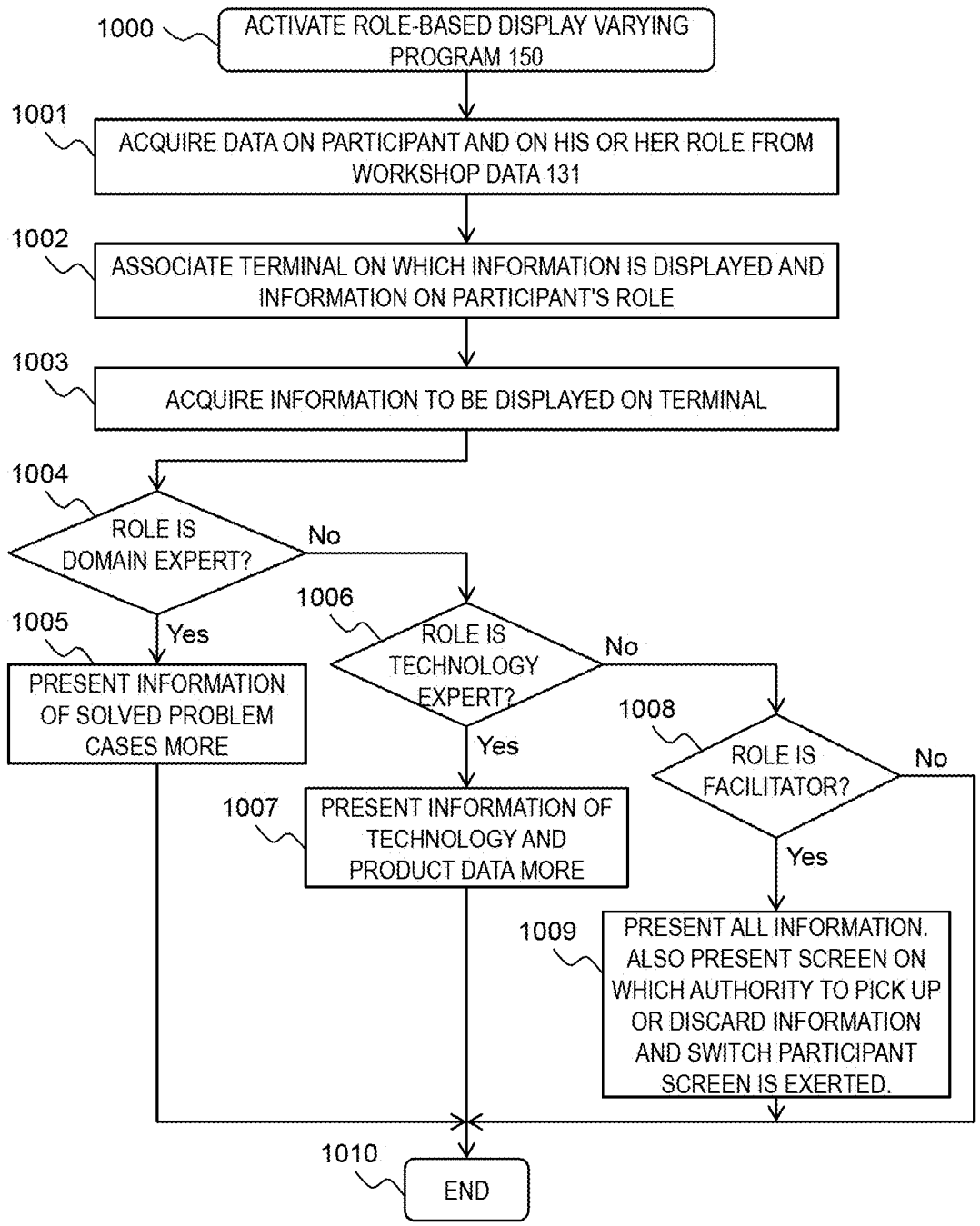
FIG. 10 is a flowchart for illustrating an example of processing of the role-based display varying program.

FIG. 10 is a flowchart for illustrating an example of processing of the role-based display varying program 150.

In the processing described above, the same processing result is presented to every one of the participants 107 irrespective of who the participant is. The participants 107 of the workshop, however, have various backgrounds, for example, a salesperson, a system engineer, and a business manager. The role played by one participant in the course of the workshop therefore varies from the role of another participant, and the ability, the weight of the contents of an utterance, and required information vary from participant to participant. It is accordingly inadequate in some cases to merely present uniform information to the participants. For that reason, the participants 107 are each assigned a role (a technology expert, a domain expert, and the like), and is presented with processed appropriate information by varying the amount of displayed information depending on the role. A resultant deeper discussion can lead to thinking of a better idea. The role-based display varying program 150 is activated at the time of activation of the workshop assistance system 115 (Step 1000), and varies display contents of the terminals 106 by setting roles to the participants 107. The role-based display varying program 150 may be executed by predetermined operation on the terminal 105, which is used by the facilitator 104, or may be executed at timing of presenting information, and may not be executed depending on settings.

The role-based display varying program 150 first acquires data on a participant and on his or her role from the workshop data 131 (illustrated in FIG. 17) (Step 1001).

The role-based display varying program 150 next associates one of the terminals 106 on which information (for example, recommendation) is to be displayed and the information on the role of one of the participants 107 whose data has been acquired (Step 1002).

Next, information to be presented on the one of the terminals 106 is acquired (Step 1003).

Next, whether the role of the one of the participants 107 is a domain expert (Step 1004), a technology expert (Step 1006), or the facilitator 104 (Step 1008) is determined.

When the role of the one of the participants 107 is the domain expert ("Yes" in Step 1004), control is exerted so that information of solved problem cases is presented more on the one of the terminals 106 that is operated by the one of the participants 107 (Step 1005).

When the role of the one of the participants 107 is the technology expert ("Yes" in Step 1006), control is exerted so that information of the technology and product data is presented more on the one of the terminals 106 that is operated by the one of the participants 107 (Step 1007).

When the role of the one of the participants 107 is the facilitator 104 ("Yes" in Step 1008), control is exerted so that all information is presented on the terminal 105 of the one of the participants 107 (the facilitator 104). A setting screen on which the authority to pick up or discard information, to switch a participant screen, and the like can be exerted is presented as well (Step 1009).

The processing of the role-based display varying program 150 is then ended (Step 1010).

In the processing described above, information is presented following settings dependent on the role, but settings for not presenting information to begin with may be added as an option. Roles other than the technology expert and the domain expert may also be added, and a configuration in which information presentation modes suited to the roles can be set may be employed. A participant may be presented with display of information delivered by other people whose roles are the same as or different from the role of the participant, for example, a problem brought up by a person whose role is a salesperson.

FIG. 11 is a diagram for illustrating table for showing a configuration example of the problem data 125.

The problem data 125 is generated by the problem data generation program 145, and is stored in the data server 120. The problem data 125 is configured as a collection of records in each of which a workshop ID 1101, a problem number 1103, text-data-and-utterer 1104, a problem title 1105, and other types of data are associated with one another, with a problem ID 1102 as a key. The text-data-and-utterer 1104 includes an identified utterer and contents of an utterance in a text format, but it is not always required to identify an utterer. When an utterer is successfully identified, the role-based display varying program 150 may be utilized to control information to be presented based on the role of the utterer. The problem data 125, which is in a table format in the at least one embodiment, may take other forms. Data structures described below may also have structures other than illustrated structures.

FIG. 12 is a diagram for illustrating table for showing a configuration example of the business field-based problem pattern data 126.

The business field-based problem pattern data 126 is stored in the data server 120 in advance, and is configured as a collection of records in each of which a business field 1202 afflicted with a problem, a business operation process 1203 afflicted with the problem, a target 1204 of problem solving (a person afflicted with the problem), the problem 1205, a technology and product 1206 usable to solve the problem, and other types of data are associated with one another, with a business field-based problem pattern data ID 1201 as a key. A problem common to business fields and a product or a technology that deals with the problem can be acquired from the business field-based problem pattern data 126.

FIG. 13 is a diagram for illustrating table for showing a configuration example of the social problem pattern data 127.

The social problem pattern data 127 is stored in the data server 120 in advance, and is configured as a collection of records in each of which a social problem 1302, problem details 1303, a KPI 1304 designed to solve the problem, and other types of data are associated with one another, with a social problem pattern data ID 1301 as a key. The social problem pattern data 127 may include a plurality of KPIs designed to solve the same problem. Among others, a social significance of the solving of a problem discussed with assistance of the workshop assistance system 115 can be acquired from the social problem pattern data 127.

FIG. 14 is a diagram for illustrating table for showing a configuration example of the technology and product data 128.

The technology and product data 128 is stored in the data server 120 in advance, and is configured as a collection of records in each of which a business field 1402 to which a technology and product is applied, a technology and product name 1403, the outline 1404 of the technology and product, the problem 1405 that can be solved with the technology and product, the feature 1406 of the technology and product, and other types of data are associated with one another, with a technology and product data ID 1401 as a key. Among others, an outline and feature of a technology or a product that is available to solve a problem, and a problem that can be dealt with by a technology or a product can be acquired from the technology and product data 128.

FIG. 15 is a diagram for illustrating table for showing a configuration example of the idea data 129.

The idea data 129 is generated by the idea data generation program 148, and is configured as a collection of records in each of which a workshop ID 1502, an idea number 1503, an idea name 1504, idea details 1505, a conceptor 1506, text 1507 that is contents of a discussion on the idea in a text format, a solved problem 1508 solved by the idea, a technology and product 1509 utilized in the idea, and other types of data are associated with one another, with an idea ID 1501 as a key.

FIG. 16 is a diagram for illustrating table for showing a configuration example of the solved problem case data 130.

The solved problem case data 130 is stored in the data server 120 in advance, and is configured as a collection of records in each of which a case name 1602 of a case that has a problem solved, a category (a business type in which the problem has been solved) 1603, an outline 1604 of how the problem has been solved, a problem 1605, contents of a solution 1606, a technology 1607 utilized in the case, data 1608 used or generated in the case, a feedback 1609 obtained in the workshop, and other types of data are associated with one another, with a case ID 1601 as a key. A problem occurring in another business field and means to solve the problem (a solution and a technology) can be acquired from the solved problem case data 130.

FIG. 17 is a diagram for illustrating table for showing a configuration example of the workshop data 131.

The workshop data 131 is stored in the data server 120 prior to the start of a workshop, and is configured as a collection of records in each of which a workshop name 1702, a category 1703, a facilitator 1704, participants 1705 and 1707, roles 1706 and 1708 of the participants, and other types of data are associated with one another, with a workshop ID 1701 as a key. The workshop data 131 is referred to by the role-based display varying program 150 in order to control displayed contents depending on the roles of participants. The role of each participant can be changed by operating the terminal 105, which is used by the facilitator 104.

Figure 18:
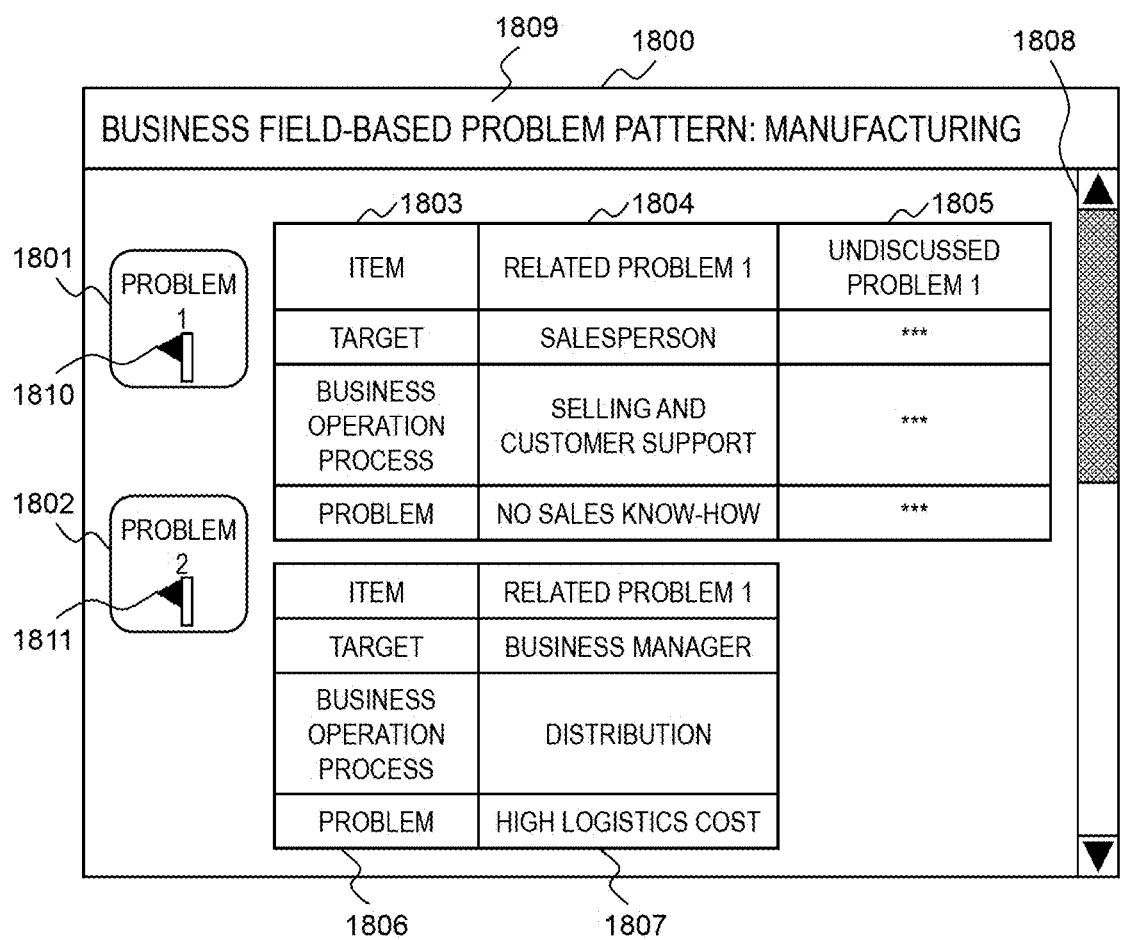
FIG. 18 is a diagram for illustrating an example of a business field-based problem pattern display screen.

FIG. 18 is a diagram for illustrating an example of a business field-based problem pattern display screen 1800 to be displayed on the terminals 105 and 106.

The business field-based problem pattern display screen 1800 includes display areas for problem numbers 1801 and 1802, items 1803 and 1806, which indicate meanings of displayed data (target, business operation process, business field-based common problem, and the like), related problems 1804 and 1807 related to the problems 1801 and 1802, an undiscussed problem 1805, and a category 1809 of a business field. A scroll bar 1808 is placed on the business field-based problem pattern display screen 1800 to slide the screen when there are a plurality of problems and not all of the problems can be displayed at once on the screen. Flags 1810 and 1811 indicating that a problem of interest is a common problem in a business field of interest can be displayed in the display areas for the problem numbers 1801 and 1802. When there are too many characters to be displayed in the display areas for the related problems 1804 and 1807 and the undiscussed problem 1805, a sub-screen for displaying details of a problem may be displayed by selection operation (a click or a tap) that selects one of the display areas for the related problems 1804 and 1807 and the undiscussed problem 1805. The flags 1810 and 1811 may be displayed in problem number display areas on other screens described later.

FIG. 19 is a diagram for illustrating an example of a social problem pattern display screen 1900 to be displayed on the terminals 105 and 106.

The social problem pattern display screen 1900 includes display areas for all problems 1901, which display social problem data of all problems, a problem number 1902 used when social problem data is to be displayed on a problem-by-problem basis, items 1903 and 1906, which indicate meanings of displayed data (problem details indicating detailed contents of a social problem, KPI to be improved in order to solve the problem, and the like), and social problems 1904, 1905, and 1907 related to discussed problems. A scroll bar 1908 is placed on the social problem pattern display screen 1900 to slide the screen when there are a plurality of problems and not all of the problems can be displayed at once on the screen. A sub-screen for displaying details of a case related to a social problem may be displayed by selection operation (a click or a tap) that selects one of the display areas for the social problems 1904, 1905, and 1907.

FIG. 20 is a diagram for illustrating an example of a technology and product display screen 2000 to be displayed on the terminals 105 and 106.

The technology and product display screen 2000 is a screen for displaying technologies or products that are related to a problem, and includes display areas for problem numbers 2001 and 2002, items 2003 and 2006, which indicate meanings of displayed data (technology and product name, outline, feature of the technology and product, and the like), technologies and products 2004, 2005, and 2007 related to problems, and a category 2009 of a business field. The display area for the category 2009 has the form of a pulldown menu and, by switching categories, technologies and products relevant to the switched-to business field category can be displayed. A scroll bar 2008 is placed on the technology and product display screen 2000 to slide the screen when there are a plurality of problems and not all of the problems can be displayed at once on the screen. A sub-screen for displaying details of a technology and product may be displayed by selection operation (a click or a tap) that selects one of the display areas for the technologies and products 2004, 2005, and 2007. In a part for description of a technology and product, an image for illustrating the technology and product may be displayed in addition to characters.

Figure 21:
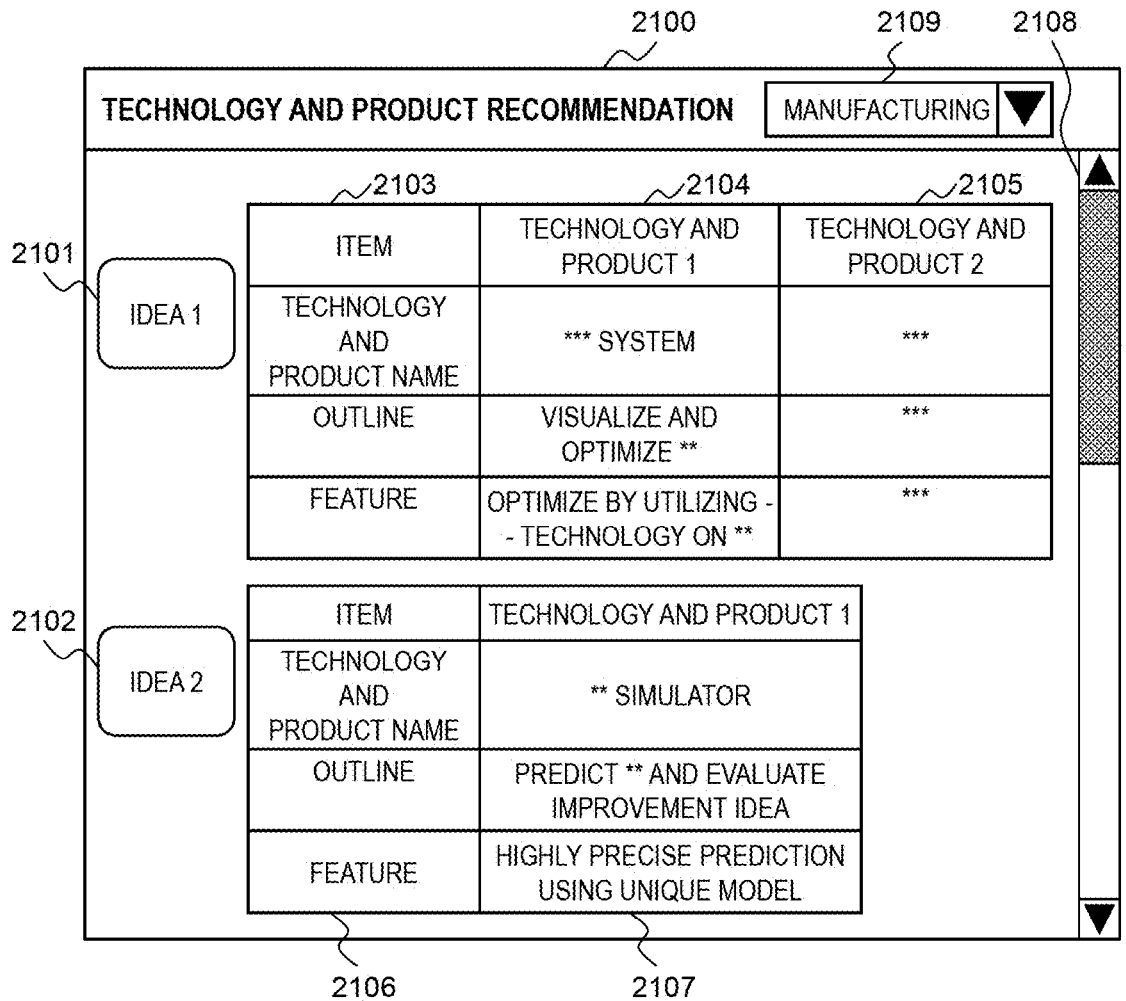
FIG. 21 is a diagram for illustrating an example of a technology and product display screen.

FIG. 21 is a diagram for illustrating an example of a technology and product display screen 2100 to be displayed on the terminals 105 and 106.

The technology and product display screen 2100 is a screen for displaying technologies or products that are related to an idea, and includes display areas for idea numbers 2101 and 2102, items 2103 and 2106, which indicate meanings of displayed data (technology and product name, outline, feature of the technology and product, and the like), technologies and products 2104, 2105, and 2107 related to ideas, and a category 2109 of a business field. The display area for the category 2109 has the form of a pulldown menu and, by switching categories, technologies and products relevant to the switched-to business field category can be displayed. A scroll bar 2108 is placed on the technology and product display screen 2100 to slide the screen when there are a plurality of ideas and not all of the ideas can be displayed at once on the screen. A sub-screen for displaying details of a technology and product may be displayed by selection operation (a click or a tap) that selects one of the display areas for the technologies and products 2104, 2105, and 2107. In a part for description of a technology and product, an image for illustrating the technology and product may be displayed in addition to characters.

Figure 22:
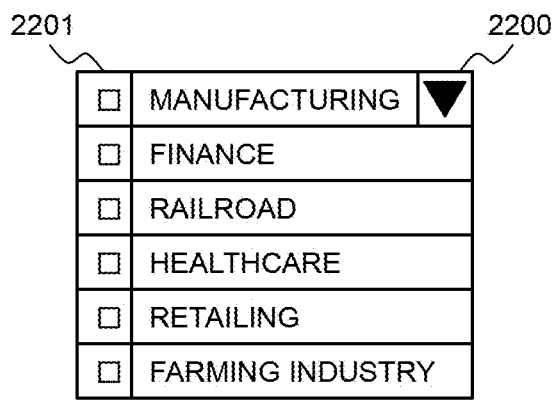
FIG. 22 is a diagram for illustrating an example of a category selection screen.

FIG. 22 is a diagram for illustrating an example of a category selection screen 2200.

The category selection screen 2200 is displayed after operating the pulldown menus of the categories 2009 and 2109 provided in, for example, the screens of FIG. 20 and FIG. 21. The category selection screen 2200 lists business field categories (manufacturing, finance, and others), and is controlled so that, by the operation of selecting one of checkboxes 2201 located by the categories, information related to a selected business field is displayed. Other than the screens of FIG. 20 and FIG. 21, a screen provided with a pulldown menu of categories is similarly installed with the category selection screen 2200.

Figure 23:
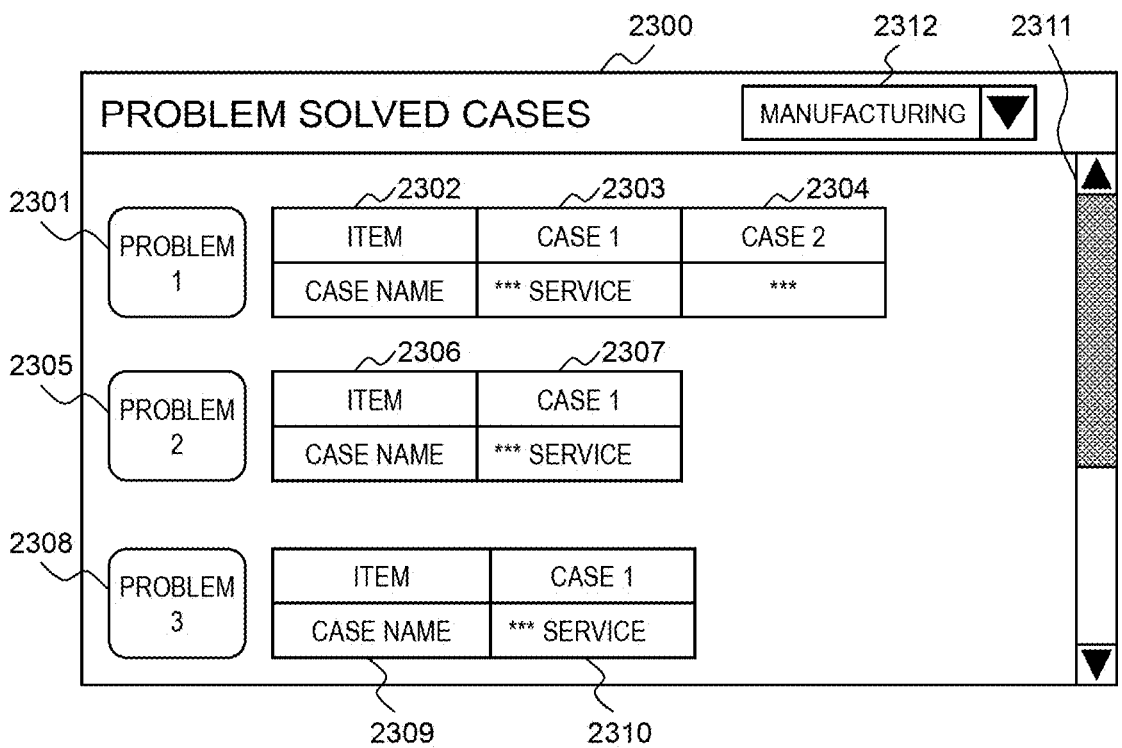
FIG. 23 is a diagram for illustrating an example of a solved problem case display screen.

FIG. 23 is a diagram for illustrating an example of a solved problem case display screen 2300.

The solved problem case display screen 2300 includes display areas for problem numbers 2301, 2305, and 2308, items 2302, 2306, and 2309, which indicate meanings of displayed data (case name and the like), case names 2303, 2304, 2307, and 2310 of cases in which problems have been solved, and a category 2312 of a business field. The display area for the category 2312 has the form of a pulldown menu and, by switching categories, cases relevant to the switched-to business field category can be displayed. A scroll bar 2311 is placed on the solved problem case display screen 2300 to slide the screen when there are a plurality of problems and not all of the problems can be displayed at once on the screen. A sub-screen (illustrated in FIG. 24) for displaying details of a case are displayed by selection operation (a click or a tap) that selects one of the display areas for the case names 2303, 2304, 2307, and 2310.

Figure 24:
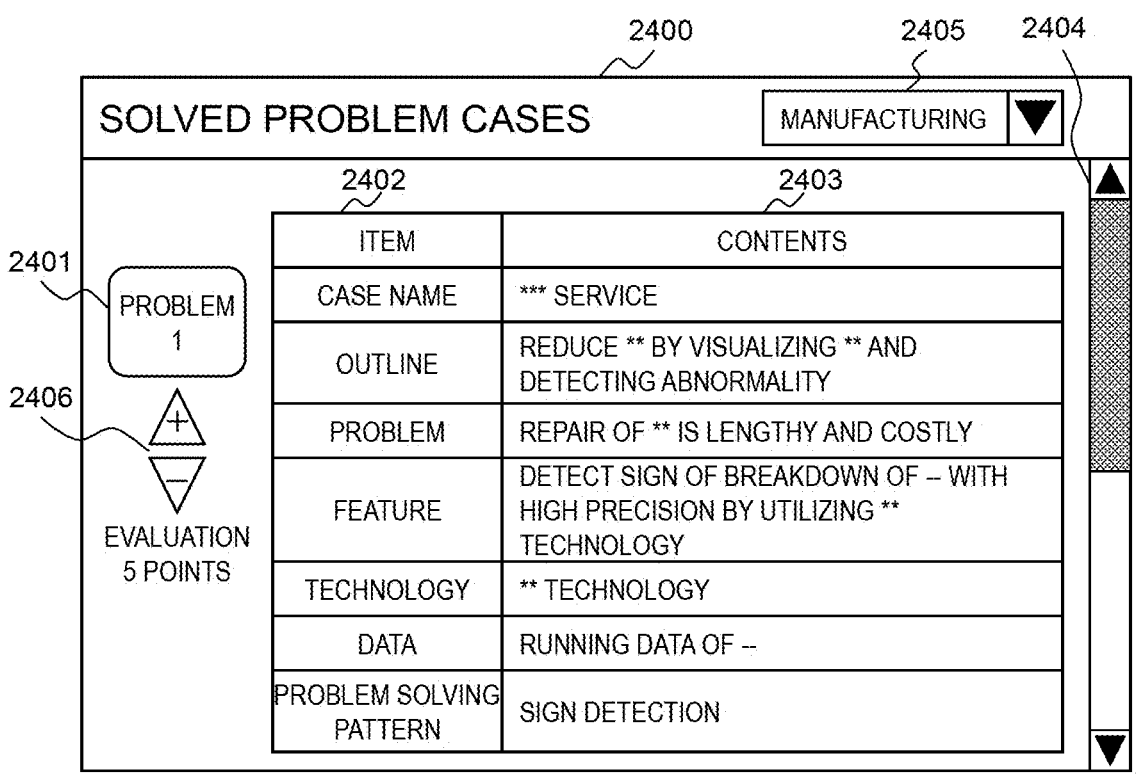
FIG. 24 is a diagram for illustrating an example of a case details display screen.

FIG. 24 is a diagram for illustrating an example of a case details display screen 2400. The case details display screen 2400 is a sub-screen displayed by selection operation (a click or a tap) that selects one of the display areas for the case names 2303, 2304, 2307, and 2310 on the solved problem case display screen 2300. The case details display screen 2400 includes a problem number 2401, an item 2402, which indicates meanings of displayed data (case name, outline, problem, feature, technology, data, problem solving pattern, and the like), and contents 2403 of each item. A scroll bar 2404 is placed on the case details display screen 2400 to slide the screen when there are a plurality of display items and not all of the display items can be displayed at once on the screen. The case details display screen 2400 also includes an input part 2406 in which an evaluation score indicating an evaluation of a case and the evaluation can be input.

Embodiments of this invention include a mode in which the workshop assistance system 115 is utilized in a workshop that uses paper and sticky notes, and a mode in which a large-sized display that is a touch panel or the like and electronic sticky notes are used. The embodiment described with reference to FIG. 1 to FIG. 24 are applicable to both of those two modes. The mode in which a large-sized display that is a touch panel or the like and electronic sticky notes are used is described below.

Figure 25:
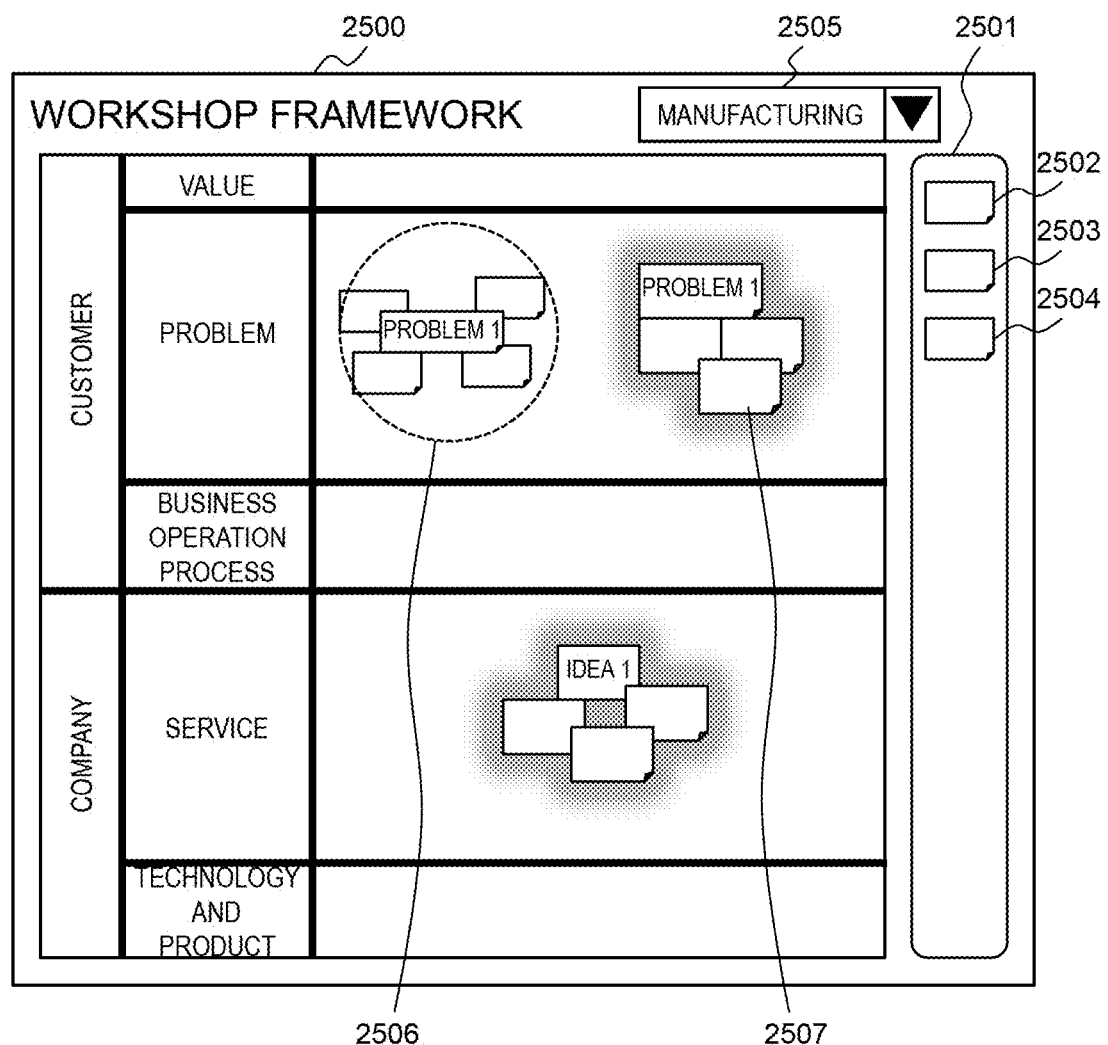
FIG. 25 is a diagram for illustrating an example of a screen of a framework.

FIG. 25 is a diagram for illustrating an example of a screen 2500 of a framework 100 in which a touch panel-type large-sized display is used.

The screen 2500 includes, inside a framework, display areas for electronic sticky notes 2502, 2503, and 2504, an electronic sticky note placement area 2501, and a category 2505 of a business field. The display area for the category 2505 has the form of a pulldown menu and, by switching categories, display can be switched to information relevant to the switched-to business field category.

A phase of a workshop can be identified by placing one of the electronic sticky notes 2502, 2503, and 2504 in a predetermined place in the framework, and a trigger can thus be omitted. For example, when one of the electronic sticky notes 2502, 2503, and 2504 is placed in a field for technologies and products, it is determined that the workshop is in a phase in which a discussion is held on a technology and product, and the technology and product search program 146 can automatically be executed.

When an electronic sticky note bearing "Problem 1" is placed, another electronic sticky note is placed around this electronic sticky note, and pieces of information of those electronic sticky notes are shared, pieces of information written on the electronic sticky notes and audio data in a period that ends with placement of an electronic sticky note bearing "Problem 2" are determined to be discussion information of Problem 1, and problem data can thus be created. This enables omission of a trigger that is "That was Problem 1."

A trigger that is "The title of Problem 1 is *." can be omitted by placing an electronic sticky note bearing "Title: *" around the electronic sticky node bearing "Problem 1." The electronic sticky note "around" the electronic sticky note bearing "Problem 1" may be a note closer than a predetermined distance on the display at a central position of the electronic sticky note (2506), or may be a note connected directly or indirectly to the electronic sticky note bearing "Problem 1" (2507).

The description given above applies to frames other than the frame for problems, for example, a frame for ideas.

An electronic sticky note may be generated from audio data by automatic conversion into text, to be added to the electronic sticky note placement area 2501.

A technology and product selected by selection operation (a click or a tap) that selects the technology and product on the technology and product display screen 2000 (FIG. 20) or 2001 (FIG. 21) may be placed in the field for technologies and products of the screen 2500.

As described above, according to the at least one embodiment of this invention, the problem processing module (the problem data processing program 147) searches the solved problem case data 130 based on the problem data 125 generated from a discussion among the participants 107, and the idea generation module (the idea data generation program 148) presents the problem data 125 and solved problem case data found in the search to the participants 107. Appropriate information based on the phase in the course of the workshop is accordingly presented to the participants in an appropriate manner, irrespective of expertise of the participants and knowledge held by the participants about business fields. Discussion in each phase can consequently be deepened, and a specific deliverable with a high customer value can be generated in the workshop.

The idea generation module (the idea data generation program 148) generates the idea data 129 by converting utterances of the participants 107 that are related to thinking of an idea into text. Idea data can accordingly be generated by automatically recording utterances.

The problem processing module (the problem data processing program 147) searches, when receiving a trigger for starting technology discussion, the technology and product data 128 based on the problem data 125, and presents technology and product data found in the search to the participants 107. The problem discussion can accordingly be deepened in relation to a technology and product, and a solution by which a problem can actually be solved can be presented.

The search module (the technology and product search program 146) searches the technology and product data 128 based on the idea data 129, and presents technology and product data found in the search to the participants 107. The idea discussion can accordingly be deepened in relation to a technology and product, and a solution by which a problem can actually be solved can be presented.

The problem generation module (the problem data generation program 145) generates, when receiving a trigger for starting a discussion of a problem, the problem data 125 by converting utterances of the participants 107 into text. Problem data can accordingly be generated by automatically recording utterances.

The problem processing module (the problem data processing program 147) searches, when receiving a trigger for starting a discussion of a business field-based problem, the business field-based problem pattern data 126 based on the problem data 125, and presents information of a business field-based problem found in the search to the participants 107. The problem discussion can accordingly be deepened by referring to a problem common to business fields, and a product or a technology that deals with the problem can be acquired.

The problem processing module (the problem data processing program 147) searches, when receiving a trigger for starting a value discussion, the social problem pattern data 127 based on the problem data 125, and presents information of a social problem found in the search to the participants 107. A problem being discussed can accordingly be linked to a larger social problem to be redefined as a social problem and, with a social significance of the solving of the problem clarified, cooperation with other companies is made easy.

The idea generation module (the idea data generation program 148) presents the problem data 125 to the participants 107 when receiving a trigger for starting a discussion of an idea, and converts utterances of the participants 107 into text to generate a first version of the idea data 129. The search module (the technology and product search program 146) searches the technology and product data 128 based on the generated first version of the idea data 129, and presents technology and product data found in the search to the participants 107. The problem processing module (the problem data processing program 147) searches the solved problem case data 130 based on the problem data 125. The idea generation module (the idea data generation program 148) presents the problem data 125 and solved problem case data found in the search to the participants 107, and converts utterances of the participants 107 into text to generate a second version of the idea data 129. The search module (the technology and product search program 146) searches the technology and product data 128 based on the generated second version of the idea data 129, and presents technology and product data found in the search to the participants 107.

The idea discussion can accordingly be deepened further by screening an idea that has been thought of with solved cases. A free discussion of an idea without influence from solved cases is also possible because the idea discussion is not premised on solved cases. An idea can also be thought of from a problem instead of from solved cases.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A workshop assistance system, which includes a computer having an arithmetic apparatus configured to execute predetermined processing, a storage device coupled to the arithmetic apparatus, and a communication interface coupled to the arithmetic apparatus,
   the computer being configured to access solved problem case data including information of solved cases that correspond to problem data,
   the workshop assistance system comprising:
   a problem processing module configured to search, by the arithmetic apparatus, solved cases based on problem data that is generated from a discussion among participants; and
   an idea generation module configured to present, by the arithmetic apparatus, idea data including the generated problem data and the information of the solved cases found in the search to the participants,
   wherein the computer is configured to access business field-based problem pattern data including information of business field-based problems that correspond to problem data, and social problem pattern data including information of social problems that correspond to the problem data, and
   wherein the problem processing module is configured to:
     search the business field-based problems based on the generated problem data, and present information of a business field-based problem found in the search to the participants in a case of receiving a trigger for starting a discussion of the business field-based problem; and
     search the social problems based on the generated problem data, and present information of a social problem found in the search to the participants in a case of receiving a trigger for starting a discussion of a value.

2. The workshop assistance system according to claim 1, wherein the idea generation module is configured to generate the idea data by converting utterances of the participants that are related to thinking of an idea into text.

3. The workshop assistance system according to claim 1,
wherein the computer is configured to access technology and product data including information of at least one of a collection of technologies or a collection of products that correspond to problem data, and
wherein the problem processing module is configured to search at least one of the collection of technologies or the collection of products based on the generated problem data, and present information of at least one of a technology or a product that are found in the search to the participants in a case of receiving a trigger for starting a discussion of a technology.

4. The workshop assistance system according to claim 1,
wherein the computer is configured to access technology and product data including information of at least one of a collection of technologies or a collection of products that correspond to problem data, and
wherein the workshop assistance system further comprises a search module configured to search, by the arithmetic apparatus, at least one of the collection of technologies or the collection of products based on the generated idea data, and present information of at least one of a technology or a product that are found in the search to the participants.

5. The workshop assistance system according to claim 4,
wherein the idea generation module is configured to generate first idea data by presenting the generated problem data to the participants, and converting utterances of the participants into text in a case of receiving a trigger for starting a discussion of an idea,
wherein the search module is configured to search at least one of the collection of technologies or the collection of products based on the generated first idea data, and present information of at least one of the technology or the product that are found in the search to the participants,
wherein the problem processing module is configured to search the solved cases based on the generated problem data,
wherein the idea generation module is configured to generate second idea data by presenting the generated problem data and information of a solved case found in the search to the participants, and converting the utterances of the participants into text, and
wherein the search module is configured to search at least one of the collection of technologies or the collection of products based on the generated second idea data, and present information of at least one of a technology or a product that are found in the search.

6. The workshop assistance system according to claim 1, further comprising a problem generation module configured to generate problem data by the arithmetic apparatus by converting utterances of the participants into text in a case of receiving a trigger for starting a discussion of a problem.

7. A workshop assistance method, which is executed by a computer,
the computer having an arithmetic apparatus configured to execute predetermined processing, a storage device coupled to the arithmetic apparatus, and a communication interface coupled to the arithmetic apparatus,
the computer being configured to access solved problem case data including information of solved cases that correspond to problem data,
the workshop assistance method comprising:
a problem processing step of searching, by the arithmetic apparatus, solved cases based on problem data that is generated from a discussion among participants; and
an idea generation step of presenting, by the arithmetic apparatus, idea data including the generated problem data and the information of the solved cases found in the search to the participants,
wherein the computer is configured to access business field-based problem pattern data including information of business field-based problems that correspond to problem data, and social problem pattern data including information of social problems that correspond to the problem data, and
wherein the problem processing step comprises:
searching, by the arithmetic apparatus, the business field-based problems based on the generated problem data, and presenting information of a business field-based problem found in the search to the participants in a case of receiving a trigger for starting a discussion of the business field-based problem; and
searching, by the arithmetic apparatus, the social problems based on the generated problem data, and presenting information of a social problem found in the search to the participants in a case of receiving a trigger for starting a discussion of a value.

8. The workshop assistance method according to claim 7, wherein the idea generation step includes generating, by the arithmetic apparatus, the idea data by converting utterances of the participants that are related to thinking of an idea into text.

9. The workshop assistance method according to claim 7,
wherein the computer is configured to access technology and product data including information of at least one of a collection of technologies or a collection of products that correspond to problem data, and
wherein the problem processing step comprises searching, by the arithmetic apparatus, at least one of the collection of technologies or the collection of products based on the generated problem data, and presenting information of at least one of a technology or a product that are found in the search to the participants in a case of receiving a trigger for starting a discussion of a technology.

10. The workshop assistance method according to claim 7,
wherein the computer is configured to access technology and product data including information of at least one of a collection of technologies or a collection of products that correspond to problem data, and
wherein the workshop assistance method further comprises a search step of searching, by the arithmetic apparatus, at least one of the collection of technologies or the collection of products based on the generated idea data, and presenting information of at least one of a technology or a product that are found in the search to the participants.

11. The workshop assistance method according to claim 10,
wherein the idea generation step comprises generating, by the arithmetic apparatus, first idea data by presenting, the generated problem data to the participants, and converting utterances of the participants into text in a case of receiving a trigger for starting a discussion of an idea, wherein the search step comprises searching, by the arithmetic apparatus, at least one of the collection of technologies or the collection of products based on the generated first idea data, and presenting information of at least one of the technology or the product that are found in the search to the participants, wherein the problem processing step comprises searching, by the arithmetic apparatus, the solved cases based on the generated problem data, wherein the idea generation step comprises generating, by the arithmetic apparatus, second idea data by presenting the generated problem data and information of a solved case found in the search to the participants, and converting the utterances of the participants into text, and wherein the search step comprises searching, by the arithmetic apparatus, at least one of the collection of technologies or the collection of products based on the generated second idea data, and presenting information of at least one the a technology and the product that are found in the search.

12. The workshop assistance method according to claim 7, further comprising a problem generation step of generating, by the arithmetic apparatus, problem data by converting utterances of the participants into text in a case of receiving a trigger for starting a discussion of a problem.

* * * * *